(12) United States Patent
Asai

(10) Patent No.: US 11,025,603 B2
(45) Date of Patent: *Jun. 1, 2021

(54) SERVICE PROVIDING SYSTEM, SERVICE DELIVERY SYSTEM, SERVICE PROVIDING METHOD, AND NON-TRANSITORY RECORDING MEDIUM

(71) Applicant: Takahiro Asai, Kanagawa (JP)

(72) Inventor: Takahiro Asai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 5 days.

This patent is subject to a terminal disclaimer.

(21) Appl. No.: 16/125,930

(22) Filed: Sep. 10, 2018

(65) Prior Publication Data

US 2019/0020644 A1    Jan. 17, 2019

Related U.S. Application Data

(63) Continuation of application No. PCT/JP2017/009995, filed on Mar. 13, 2017.

(30) Foreign Application Priority Data

Mar. 14, 2016    (JP) .............................. JP2016-050019

(51) Int. Cl.
*H04L 29/06* (2006.01)
*H04L 29/08* (2006.01)
(Continued)

(52) U.S. Cl.
CPC ............ *H04L 63/08* (2013.01); *H04L 63/083* (2013.01); *H04L 63/0876* (2013.01);
(Continued)

(58) Field of Classification Search
CPC . H04L 63/1458; H04L 63/107; H04L 63/083; H04L 63/0876; G06F 21/34; G06F 21/35; G06F 21/335
(Continued)

(56) References Cited

U.S. PATENT DOCUMENTS 6,640,301 B1    10/2003 Ng
7,120,928 B2    10/2006 Sheth et al.
(Continued)

FOREIGN PATENT DOCUMENTS

CN    103973874 A    8/2014
CN    104765990 A    7/2015
(Continued)

OTHER PUBLICATIONS

U.S. Office Action for corresponding U.S. Appl. No. 16/142,403 dated Nov. 22, 2019.

(Continued)

*Primary Examiner* — Bryan F Wright

(74) *Attorney, Agent, or Firm* — Harness, Dickey & Pierce, P.L.C.

(57) ABSTRACT

When providing a service to a communication terminal, a service providing system causes an authentication system to perform authentication of a user of the communication terminal. The service providing system includes a processor configured to receive, from the communication terminal, terminal identification information to identify the communication terminal, the terminal identification information including a to-be-authenticated section to be used for the authentication of the user and a not-to-be-authenticated section not to be used for the authentication of the user; and transmit, to the authentication system, only the to-be-authenticated section out of the received terminal identification information.

9 Claims, 20 Drawing Sheets

(51) Int. Cl.
*H04W 12/06* (2021.01)
*G06F 21/30* (2013.01)
*G06F 21/41* (2013.01)

(52) U.S. Cl.
CPC ......... *H04L 67/146* (2013.01); *H04W 12/068* (2021.01); *G06F 21/30* (2013.01); *G06F 21/41* (2013.01); *H04L 63/0815* (2013.01); *H04L 63/10* (2013.01); *H04L 67/02* (2013.01)

(58) Field of Classification Search
USPC .......................................................... 726/7
See application file for complete search history.

(56) References Cited

U.S. PATENT DOCUMENTS

| | | |
|---|---|---|
| 7,437,457 B1 | 10/2008 | Eisendrath et al. |
| 7,908,647 B1 | 3/2011 | Polis et al. |
| 7,979,912 B1* | 7/2011 | Roka ............... G06F 21/34 726/28 |
| 8,023,927 B1 | 9/2011 | Coleman et al. |
| 8,281,372 B1 | 10/2012 | Vidal |
| 8,347,093 B1 | 1/2013 | Ahmed |
| 8,959,234 B2 | 2/2015 | Lee et al. |
| 8,959,650 B1* | 2/2015 | Richards ............ G06F 21/335 726/26 |
| 9,210,375 B2 | 12/2015 | Asai |
| 9,270,942 B2 | 2/2016 | Asai |
| 9,350,947 B2 | 5/2016 | Asai |
| 9,391,996 B1 | 7/2016 | Chin et al. |
| 9,432,623 B2 | 8/2016 | Nagase et al. |
| 9,906,570 B2 | 2/2018 | Hinohara et al. |
| 2003/0216143 A1* | 11/2003 | Roese ............... H04L 63/107 455/456.1 |
| 2004/0054735 A1 | 3/2004 | Daniell et al. |
| 2004/0088424 A1* | 5/2004 | Park ............... H04L 29/06027 709/229 |
| 2004/0148500 A1 | 7/2004 | Olkin et al. |
| 2004/0187018 A1* | 9/2004 | Owen ............... G06F 21/31 713/184 |
| 2004/0243832 A1 | 12/2004 | Wilf et al. |
| 2005/0055547 A1 | 3/2005 | Kawamura |
| 2005/0108520 A1* | 5/2005 | Yamamoto .......... G06F 21/35 713/155 |
| 2005/0144279 A1 | 6/2005 | Wexelblat |
| 2006/0015609 A1 | 1/2006 | Hagale et al. |
| 2006/0109839 A1 | 5/2006 | Hino et al. |
| 2006/0206616 A1 | 9/2006 | Brown |
| 2008/0235768 A1* | 9/2008 | Walter ............... H04L 63/0428 726/3 |
| 2009/0070858 A1 | 3/2009 | Hiraide et al. |
| 2009/0187979 A1 | 7/2009 | Sever |
| 2010/0121954 A1 | 5/2010 | Yang et al. |
| 2010/0250929 A1 | 9/2010 | Schultz et al. |
| 2011/0004919 A1 | 1/2011 | Chawla et al. |
| 2011/0016322 A1 | 1/2011 | Dean et al. |
| 2011/0145907 A1 | 6/2011 | Chua |
| 2012/0036364 A1* | 2/2012 | Yoneda ............... H04L 9/3249 713/175 |
| 2012/0174196 A1* | 7/2012 | Bhogavilli ........ H04L 63/1458 726/5 |
| 2013/0031359 A1 | 1/2013 | Laidlaw et al. |
| 2013/0055368 A1 | 2/2013 | Bauckman et al. |
| 2013/0061298 A1* | 3/2013 | Longobardi ............ G06F 21/42 726/6 |
| 2013/0139234 A1 | 5/2013 | Inbaraj et al. |
| 2013/0185230 A1 | 7/2013 | Zhu et al. |
| 2014/0007209 A1 | 1/2014 | Zucker |
| 2014/0077937 A1 | 3/2014 | Kato et al. |
| 2014/0172708 A1 | 6/2014 | Chrapko et al. |
| 2014/0189058 A1 | 7/2014 | Asai |
| 2014/0282963 A1 | 9/2014 | Wildermuth et al. |
| 2014/0282979 A1 | 9/2014 | Andon |
| 2015/0040188 A1* | 2/2015 | Takeuchi ............... H04L 63/08 726/3 |
| 2015/0074615 A1 | 3/2015 | Han et al. |
| 2015/0106732 A1 | 4/2015 | Kandori et al. |
| 2015/0128240 A1 | 5/2015 | Richards et al. |
| 2015/0173501 A1 | 6/2015 | Scott |
| 2015/0282233 A1 | 10/2015 | Homma et al. |
| 2015/0319100 A1 | 11/2015 | Asai |
| 2015/0341298 A1 | 11/2015 | Blinn et al. |
| 2015/0379302 A1 | 12/2015 | Smith |
| 2016/0071407 A1 | 3/2016 | Toebes et al. |
| 2016/0092947 A1 | 3/2016 | Nagase et al. |
| 2016/0099947 A1 | 4/2016 | Asai et al. |
| 2016/0267260 A1 | 9/2016 | Jiang et al. |
| 2016/0269390 A1 | 9/2016 | Endo et al. |
| 2016/0277930 A1 | 9/2016 | Li et al. |

FOREIGN PATENT DOCUMENTS

| | | | |
|---|---|---|---|
| EP | 2765753 | A1 | 8/2014 |
| EP | 2849436 | A2 | 3/2015 |
| EP | 3068154 | A1 | 9/2016 |
| JP | 2007-110377 | A | 4/2007 |
| JP | 2009-070020 | | 4/2009 |
| JP | 2010-068294 | A | 3/2010 |
| JP | 2011-133951 | | 7/2011 |
| JP | 2013-235434 | | 11/2013 |
| JP | 2014-057221 | A | 3/2014 |
| JP | 2014-060552 | | 4/2014 |
| JP | 2014-134978 | | 7/2014 |
| JP | 2014-155128 | | 8/2014 |
| JP | 2015-018318 | | 1/2015 |
| JP | 2015-049609 | | 3/2015 |
| JP | 2015-201827 | | 11/2015 |

OTHER PUBLICATIONS

Japanese Office Action for Japanese Application No. 2018-505916 dated Dec. 3, 2019.
Anonymous: "Personal area network", Wikipedia, Feb. 27, 2016, XP055550441, https://en.wikipedia.org/w/index.php?title=Personal_area_network&oldid=707172489 [retrieved on Feb. 2, 2019], pp. 2, line 20-p. 2, line 27.
Extended Search Report for corresponding European Application No. 17774774.8 dated Feb. 13, 2019.
Extended Search Report for corresponding European Application No. 17774772.2 dated Feb. 14, 2019.
Extended European Search Report dated Feb. 27, 2019 issued in corresponding European Application No. 17774792.0.
International Search Report dated Jun. 6, 2017 in PCT/JP2017/009995 filed on Mar. 13, 2017 (with English translation).
International Search Report dated Jun. 6, 2017 in PCT/JP2017/012042 filed on Mar. 24, 2017 (with English translation).
International Search Report dated Jun. 6, 2017 in PCT/JP2017/012040 filed on Mar. 24, 2017 (with English translation).
International Search Report dated Jun. 27, 2017 in PCT/JP2017/012103 filed on Mar. 24, 2017 (with English translation).
Butkus, P.,"Identity Management in M2M Networks," https://pdfs.semanticscholar.org/8a37/108bd92287650722ad8953f87c77d04f33.pdf, Jun. 26, 2014.
Anonymous, "Social login—Wikipedia," https://en.wikipedia.org/w/index.php?title=Social_login&oldid=697290822, Dec. 29, 2015.
Anonymous, "Session Management Cheat Sheet—OWASP," https://web/archive.org/web/20160119164955/https://www.w.owasp.org/index.php/Session_Management_Cheat_Sheet, Jan. 8, 2016.
Extended European Search Report dated Dec. 19, 2018 issued in corresponding European Patent Application 17766619.
Final Office Action dated Apr. 27, 2020 for corresponding U.S. Appl. No. 16/142,403.
U.S. Office Action for corresponding U.S. Application No. 16/136,337 dated Jul. 21, 2020.
U.S. Office Action for corresponding U.S. Appl. No. 16/142,403 dated Jul. 28, 2020.
U.S. Office Action for corresponding U.S. dated No. 16/138,144 dated Jul. 30, 2020.

(56) References Cited

OTHER PUBLICATIONS

Final Office Action for corresponding U.S. Appl. No. 16/142,403 dated Dec. 15, 2020.
U.S. Office Action for corresponding U.S. Appl. No. 16/136,337 dated Feb. 1, 2021.
European Patent Office Communication pursuant to Article 94(3) EPC dated Nov. 18, 2020 for European Patent Application No. 17 774 772.2.
Analysis of Netflix's security framework for '*Watch Instantly*' service, Pomelo, LLC Tech Memo, Mar.-Apr. 2009.
U.S. Final Office Action for corresponding U.S. Appl. No. 16/138,144 dated Feb. 5, 2021.

\* cited by examiner

| SESSION ID | TERMINAL ID | IP ADDRESS |
|---|---|---|
| se01 | asai@myhost.ricoo.com/theta1 | 1.2.1.3 |
| se02 | asai@myhost.ricoo.com/pc | 1.2.1.4 |
| se03 | jim@myhost.obrom.com/theta2 | 1.2.2.3 |
| ... | ... | ... |

FIG.10

| AUTHENTICATION SYSTEM ID | URL OF AUTHENTICATION SYSTEM |
|---|---|
| a01 | http://··· |
| a02 | http://··· |
| a03 | http://··· |
| ... | ... |

FIG.11A

| USER ID (TO-BE-AUTHENTICATED SECTION) | PASSWORD |
|---|---|
| asai@myhost.ricoo.com | aaaa |
| jim@myhost.obrom.com | abab |
| ... | ... |

FIG.11B

| USER ID (TO-BE-AUTHENTICATED SECTION) | PASSWORD |
|---|---|
| asai | baba |
| kurt | bbbb |
| ... | ... |

FIG.11C

| USER ID (TO-BE-AUTHENTICATED SECTION) | PASSWORD |
|---|---|
| kondo | caca |
| kulbaski | cccc |
| ... | ... |

SERVICE PROVIDING SYSTEM, SERVICE DELIVERY SYSTEM, SERVICE PROVIDING METHOD, AND NON-TRANSITORY RECORDING MEDIUM

CROSS-REFERENCE TO RELATED APPLICATIONS

The present patent application is a continuation of international application No. PCT/JP2017/009995, filed Mar. 13, 2017, which is based on and claims priority to Japanese application No. 2016-050019, filed Mar. 14, 2016. The contents of these applications are incorporated herein by reference in their entirety.

FIELD OF THE INVENTION

The present invention relates to a service providing system, a service delivery system, a service providing method, and a non-transitory recording medium.

BACKGROUND ART

A system with which, in a case where a service is provided to a user through the Internet, the service is actually provided to the user after terminal identification information is determined as authorized information through a process where the user is authenticated with the use of the terminal identification information (an ID or the like) or a password sent from the user's communication terminal, is widely used (see Patent document 1).

SUMMARY

According to one aspect of the present invention, when providing a service to a communication terminal, a service providing system causes an authentication system to perform authentication of a user of the communication terminal. The service providing system includes a processor configured to receive, from the communication terminal, terminal identification information to identify the communication terminal, the terminal identification information including a to-be-authenticated section to be used for the authentication of the user and a not-to-be-authenticated section not to be used for the authentication of the user; and transmit, to the authentication system, only the to-be-authenticated section out of the received terminal identification information.

BRIEF DESCRIPTION OF THE DRAWINGS

FIG. 10 is a conceptual diagram illustrating one example of an authentication system management table.

FIG. 11A is a conceptual diagram illustrating one example of an authentication management table of the authentication system 7a.

FIG. 11B is a conceptual diagram illustrating one example of an authentication management table of the authentication system 7b.

FIG. 11C is a conceptual diagram illustrating one example of an authentication management table of the authentication system 7c.

DESCRIPTION OF EMBODIMENTS

In the above-described system, in a case where the user uses a plurality of own communication terminals to receive respective services, sets of terminal identification information and passwords will be respectively registered for services, and therefore, the user may experience troublesomeness.

According to embodiments of the present invention, terminal identification information includes a to-be-authenticated section and a not-to-be-authenticated section. As a result, once a user performs registration with the use of a to-be-authenticated section, the user need not perform a plurality of registrations even for a case of using a plurality of pieces of terminal identification information having different not-to-be-authenticated sections. Therefore, troublesomeness to the user can be avoided.

Now, with the use of the drawings, the embodiment will be described.

<<Overall Configuration of Embodiments>>

Figure 1:
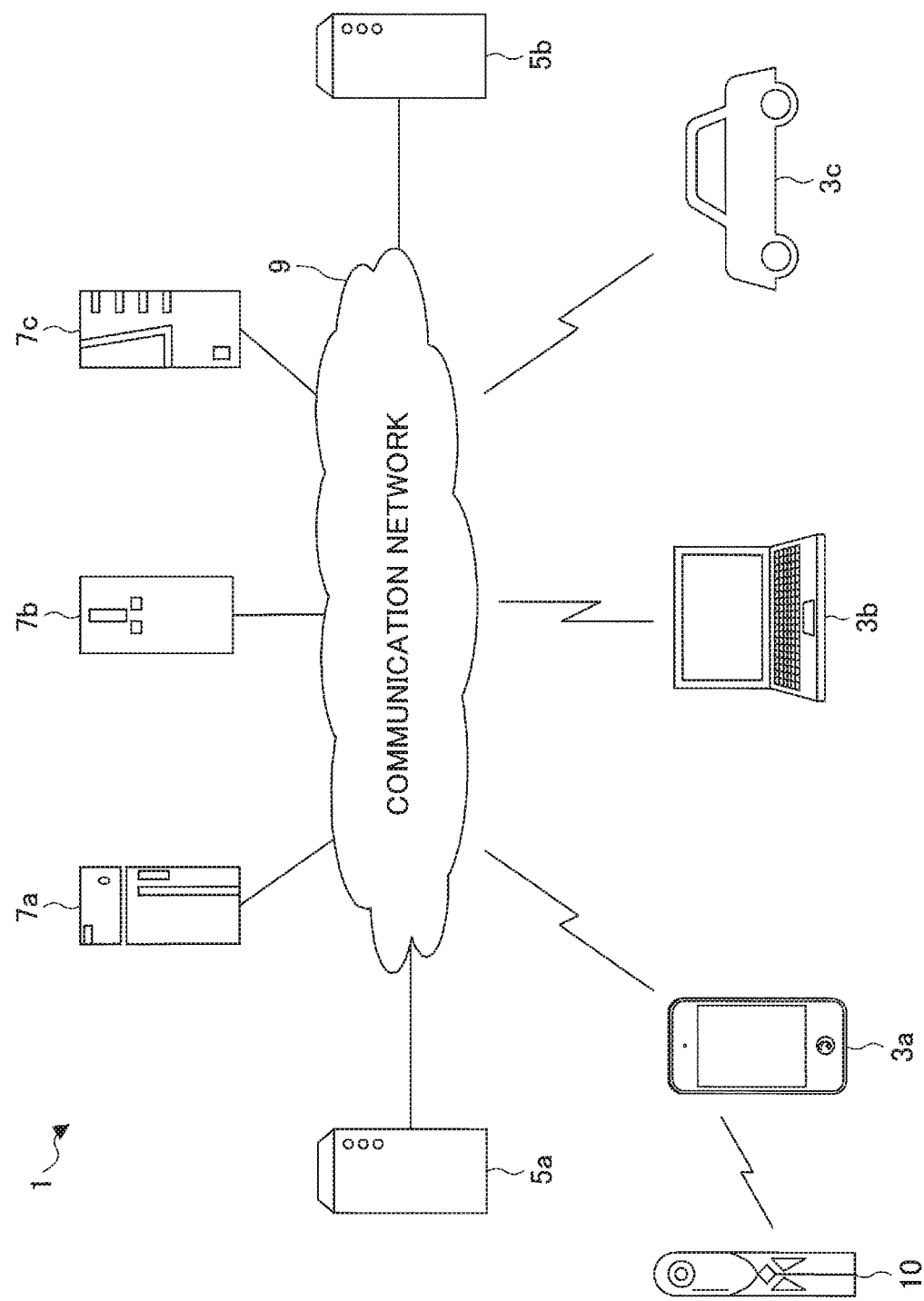
FIG. 1 is an overall configuration diagram illustrating one example of a service delivery system according to embodiments.

FIG. 1 is an overall configuration diagram illustrating one example of a service delivery system according to embodiments. As illustrated in FIG. 1, the service delivery system 1 includes a plurality of communication terminals (3a, 3b, and 3c), a plurality of service providing systems (5a and 5b), a plurality of authentication systems (7a, 7b, and 7c), and a photographing apparatus 10. These elements can perform communication with each other via a communication network 9 such as the Internet.

The photographing apparatus 10 is, for example, a digital camera, captures an image of a scene, for example, to generate a full spherical panoramic image. The communication terminal 3a is, for example, a smartphone. The communication terminal 3a performs communication with the photographing apparatus 10 with the use of short-range wireless communication technology such as Bluetooth (registered trademark). For example, as a result of the communication terminal 3a transmitting to the photographing apparatus 10 an instruction to start a photographing operation, the photographing apparatus 10 transmits to the communication terminal 3a various data obtained from a photographing operation such as image data and sound data. The photographing apparatus 10 cannot use the communication network 9 by itself, and therefore, transmits through the communication terminal 3a various data to the communication network 9. The communication terminal 3b is, for example, a personal computer. The communication terminal 3c is, for example, a car navigation apparatus.

Note that, in FIG. 1, for the sake of simplifying the explanation, the three communication terminals (3a, 3b, and 3c), the two service providing systems (5a and 5b), the three authentication systems (7a, 7b, and 7c), and the single photographing apparatus 10 are illustrated. However, the numbers of the elements are not limited to these numbers of the elements. Further, hereinafter, out of the communication terminals (3a, 3b, and 3c), any one of the communication terminals will be referred to as a "communication terminal 3". Out of the service providing systems (5a and 5b), either one of the service providing systems will be referred to as a "service providing system 5". Further, out of the authentication systems (7a, 7b, and 7c), any one of the authentication systems will be referred to as an "authentication system 7".

Further, the service providing systems 5 and the authentication systems 7 may be single computers, or each of the service providing systems 5 and the authentication systems 7 may include a plurality of computers. The photographing apparatus 10 may be also a common digital camera that does not have a function to generate a full spherical panorama image.

Further, a communication terminal 3 may be a smartphone, a personal computer, or a car navigation apparatus, as an example of a mobile terminal. Further, examples of a communication terminal 3 are not limited to these devices. For example, a communication terminal 3 may be an information processing terminal, a business machine, a home appliance, an electric component, a medical device, an industrial device, or the like. Examples of the mobile terminal include, in addition to the above-mentioned devices, a smart watch, a head mount display, a video conference terminal, a camera, a handy terminal, and a drone. Examples of the information processing terminal include a desktop PC, a tablet PC, and a server. Examples of the business machine include a copier, a facsimile machine, a MFP (Multifunction Peripheral) that has functions of a copier and a facsimile machine, an electronic blackboard, a video conference terminal, and a projector. Examples of the home appliance include a television, an air conditioner, a refrigerator, a recorder, and a microwave oven. Examples of the electric component include an electronic component such as an image pickup device. Examples of the medical device include a MRI (Magnetic Resonance Imaging) device, an EEG (Electroencephalography) device, a MEG (Magnetoencephalography) device, and an endoscope. Examples of the industrial device include a construction machine and a working robot.

<How to Use Photographing Apparatus>

With the use of FIGS. 2A-2C and FIG. 3, how to use the photographing apparatus 10 will now be described.

Figure 2A:
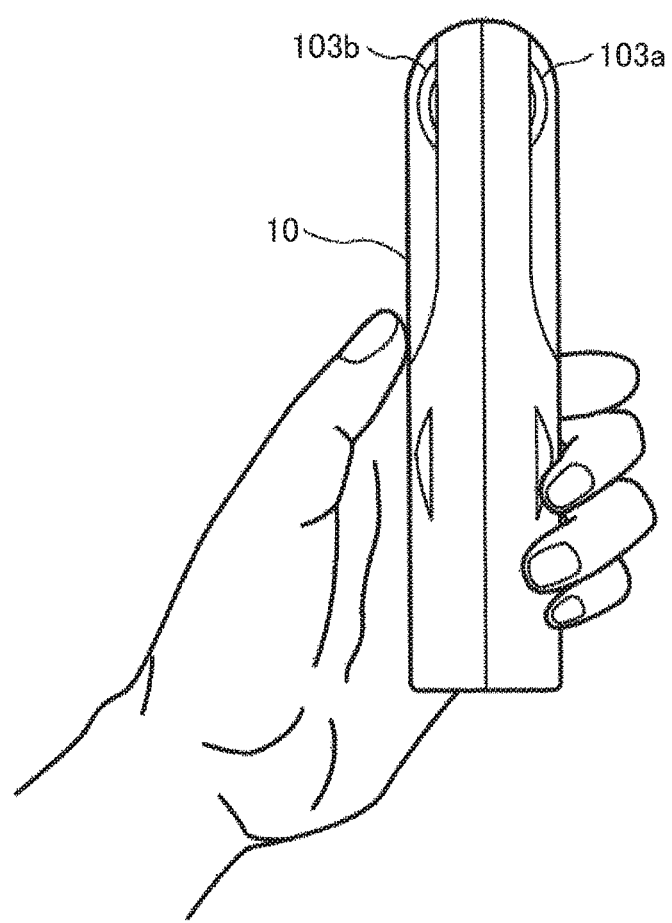
FIG. 2A is a left side view of one example of a photographing apparatus.
Figure 2B:
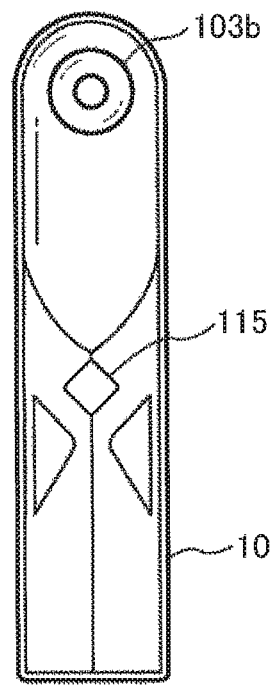
FIG. 2B is a front view of the example of the photographing apparatus.
Figure 2C:
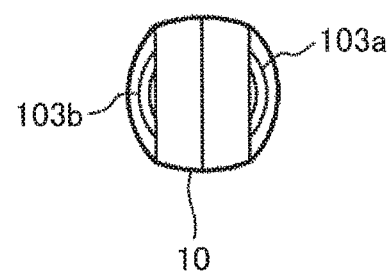
FIG. 2C is a plan view of the example of the photographing apparatus.

With the use of FIGS. 2A-2C, the exterior of the photographing apparatus 10 will now be described. FIG. 2A is a left side view of one example of the photographing apparatus, FIG. 2B is a front view of the example of the photographing apparatus, and FIG. 2C is a plan view of the example of the photographing apparatus. The photographing apparatus 10 is a digital camera for obtaining a photographed image from which a full spherical (360°) panoramic image is generated.

As illustrated in FIG. 2A, the photographing apparatus 10 has such a size that a person can hold with his or her single hand. Further, as illustrated in FIGS. 2A-2C, at an upper section of the photographing apparatus 10, an image pickup device 103a at a front side and an image pickup device 103b at a back side (rear side) are installed. Further, as illustrated in FIG. 2B, at a front side of the photographing apparatus 10, an operation part 115 such as a shutter button is installed.

Figure 3:
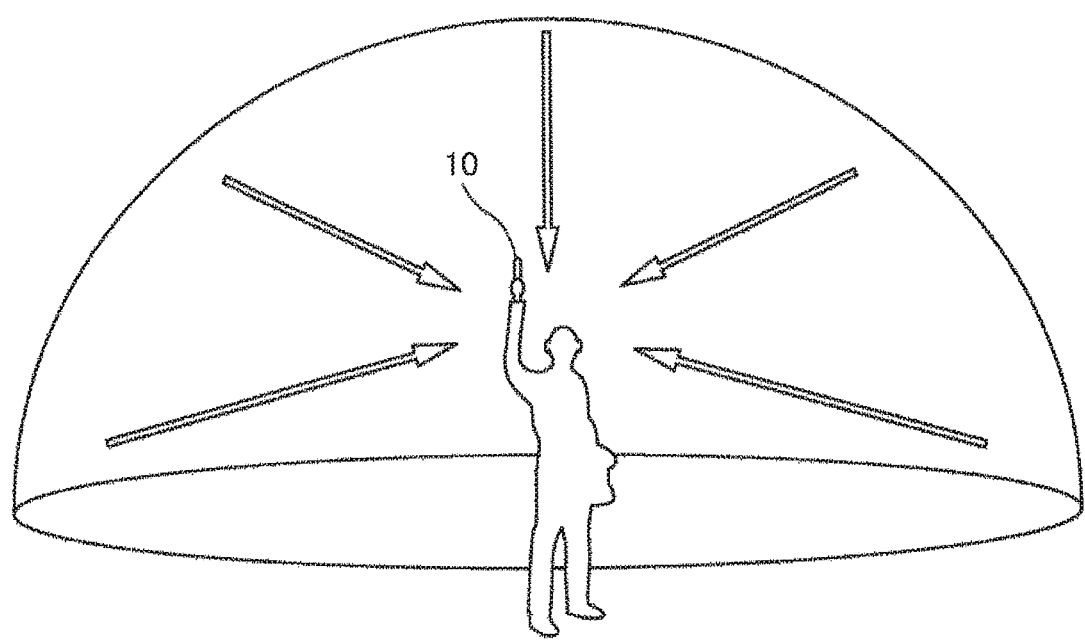
FIG. 3 is an image diagram illustrating one example of a usage state of the photographing apparatus.

Next, with the use of FIG. 3, a usage state of the photographing apparatus 10 will be described. FIG. 3 is an image diagram illustrating one example of a usage state of the photographing apparatus. As illustrated in FIG. 3, the photographing apparatus 10 is used in such a manner that a user holds the photographing apparatus 10 with his or her hand and takes an image of an object or a scene around the user. In this case, as a result of the image pickup device 103a and the image pickup device 103b illustrated in FIGS. 2A-2C capturing images of an object or a scene around the user, two hemispherical images can be obtained.

<<Hardware Configuration of Embodiments>>

Next, with the use of FIGS. 4-6, the hardware configurations of the photographing apparatus 10, the communication terminals 3, and the service providing systems 5 according to the embodiments will be described in detail.

<Hardware Configuration of Photographing Apparatus>

With the use of FIG. 4, the hardware configuration of the photographing apparatus 10 will now be described. Note that, FIG. 4 is a hardware configuration diagram of one example of the photographing apparatus 10. Below, it is assumed that the photographing apparatus 10 is an omnidirectional photographing apparatus using the two image pickup devices. However, the number of the image pickup devices may be three or more. Further, the photographing apparatus 10 is not necessarily dedicated for omnidirectional photographing. That is, the photographing apparatus 10 may have substantially the same function as an omnidirectional photographing apparatus as a result of a retrofit-type omnidirectional photographing unit being installed to a common digital camera, smartphone or the like.

Figure 4:
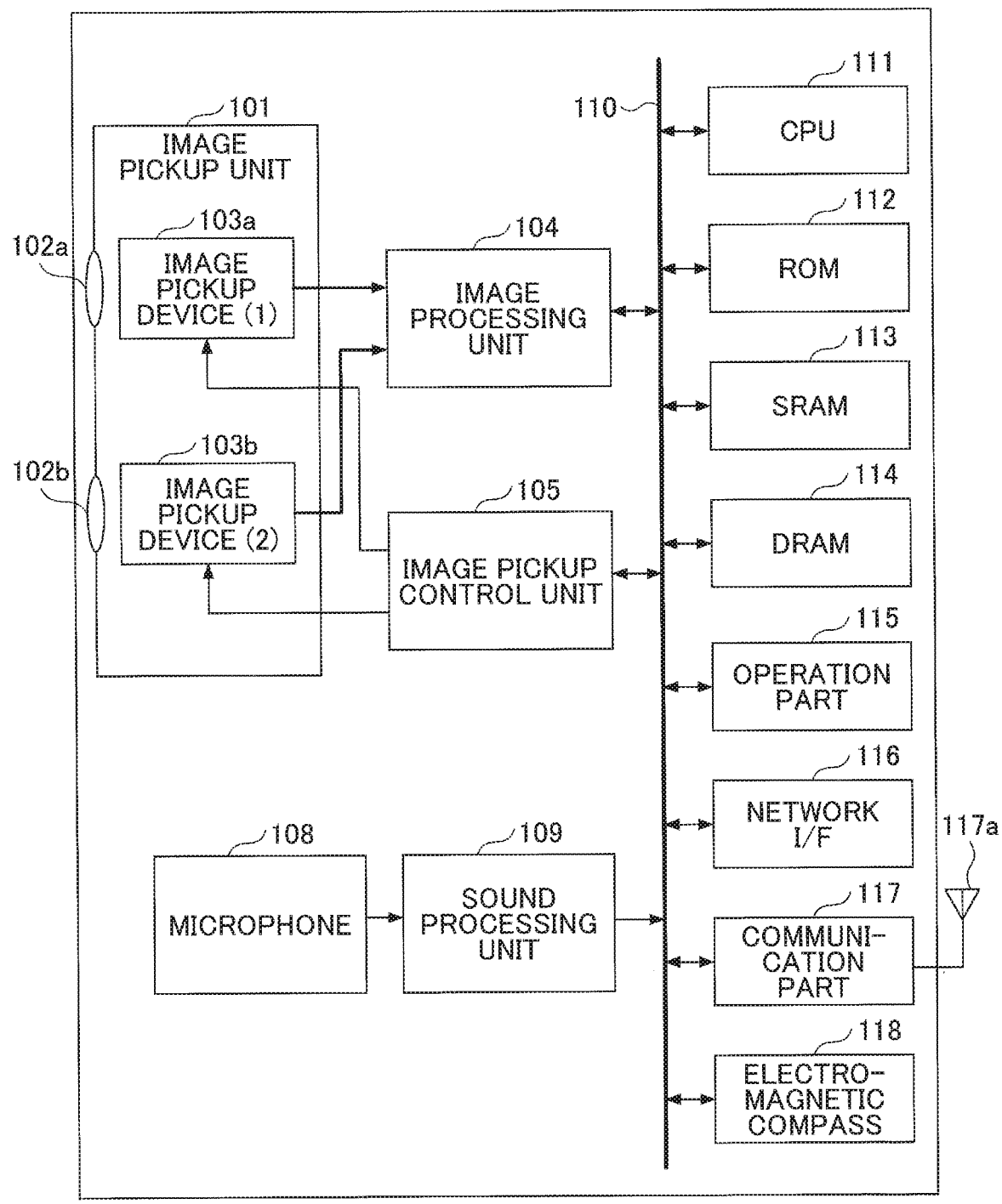
FIG. 4 is a hardware configuration diagram of one example of the photographing apparatus 10.

As illustrated in FIG. 4, the photographing apparatus 10 includes an image pickup unit 101, an image processing unit 104, an image pickup control unit 105, a microphone 108, a sound processing unit 109, a CPU (Central Processing Unit)

111, a ROM (Read-Only Memory) 112, a SRAM (Static Random Access Memory) 113, a DRAM (Dynamic Random Access Memory) 114, the operation part 115, a network I/F 116, a communication part 117, and an antenna 117a.

The image pickup unit 101 includes wide-angle lenses (so-called fish-eye lenses) 102a and 102b, each of which has a field angle greater than or equal to 180° for forming a hemispherical image, and the two image pickup devices 103a and 103b corresponding to the wide-angle lenses 102a and 102b, respectively. The image pickup devices 103a and 103b include image sensors such as CMOS (Complementary Metal Oxide Semiconductor) sensors or CCD (Charge Coupled Device) sensors converting optical images obtained through the fish-eye lenses into electric image data signals; timing circuits generating horizontal or vertical synchronization signals, pixel clocks, and so forth; and a group of registers in which various commands and parameters required for operating the image pickup devices are set.

The respective image pickup devices 103a and 103b of the image pickup unit 101 are connected with the image processing unit 104 through a parallel I/F bus. The image pickup devices 103a and 103b of the image pickup unit 101 are connected also with the image pickup control unit 105 through a serial I/F bus (an I2C bus or the like). The image processing unit 104 and the image pickup control unit 105 are connected with the CPU 111 through a bus 110. Further, to the bus 110, also the ROM 112, the SRAM 113, the DRAM 114, the operation part 115, the network I/F 116, the communication part 117, an electromagnetic compass 118, and so forth are connected.

The image processing unit 104 performs a predetermined process on image data output from the image pickup devices 103a and 103b through the parallel I/F bus, and combines the processed image data to generate Mercator image data.

Generally speaking, the image pickup control unit 105 acts as a master device, the image pickup devices 103a and 103b act as slave devices, and the image pickup control unit 105 sets commands and so forth to the group of registers of the image pickup devices 103a and 103b through the I2C bus. The commands and so forth are received from the CPU 111. Further, the image pickup control unit 105 uses also the I2C bus to receive status data and so forth of the group of registers of the image pickup devices 103a and 103b, and sends the status data and so forth to the CPU 111.

Further, in response to the shutter button of the operation part 115 being pressed, the image pickup control unit 105 sends an instruction to the image pickup devices 103a and 103b to output image data. Depending on the photographing apparatus, a preview display function or a function to display a moving picture by using a display may be implemented. In this case, the image pickup devices 103a and 103b output image data continuously at a predetermined frame rate (frames/second).

Further, as will be described later, the image pickup control unit 105 also functions as a synchronization control part in cooperation with the CPU 111 to synchronize output timing of image data from the image pickup devices 103a and 103b. Note that, according to the embodiments, the photographing apparatus 10 does not have a display part. However, the photographing apparatus 10 may have a display part.

The microphone 108 converts sound into sound (signal) data. The sound processing unit 109 receives sound data from the microphone 108 through an I/F bus, and performs a predetermined process on the sound data.

The CPU 111 performs overall control of the photographing apparatus 10 and performs required processes. The ROM 112 stores various programs for the CPU 111. The SRAM 113 and the DRAM 114 are work memories, and store a program executed by the CPU 111, data that is being processed by the CPU 111, and so forth. Especially, the DRAM 114 stores image data that is being processed by the image processing unit 104 and Mercator image data that has been processed.

As the operation part 115, various operation buttons, a power switch, a shutter button, a touch panel having both a display function and an operation function, and so forth are generally referred to. The user operates the operation buttons to input various photographing modes, photographing conditions, and so forth.

As the network I/F 116, interfaces (USB I/F and so forth) for external media such as a SD card, a personal computer, and so forth are generally referred to. The network I/F 116 may be a network interface usable for both wired communication and wireless communication. Mercator image data stored in the DRAM 114 is recorded in an external medium through the network I/F 116 or is transmitted to an external apparatus such as a communication terminal 3 through the network I/F 116 as the occasion demands.

The communication part 117 performs communication with an external apparatus such as a communication terminal 3 through the antenna 117a installed at the photographing apparatus 10 according to short-range wireless communication technology such as WiFi (wireless fidelity), NFC, or the like. It is possible to transmit Mercator image data also through the communication part 117 to an external apparatus such as a communication terminal 3.

The electromagnetic compass 118 uses terrestrial magnetism to calculate the orientation of the photographing apparatus 10 and outputs orientation information. The orientation information is one example of related information (metadata) according to Exif, and is used for image processing such as image correction on a photographed image. Note that the related information includes various data such as date and time when an image is photographed and the data size of image data.

<Hardware Configuration of Smartphone>

Figure 5:
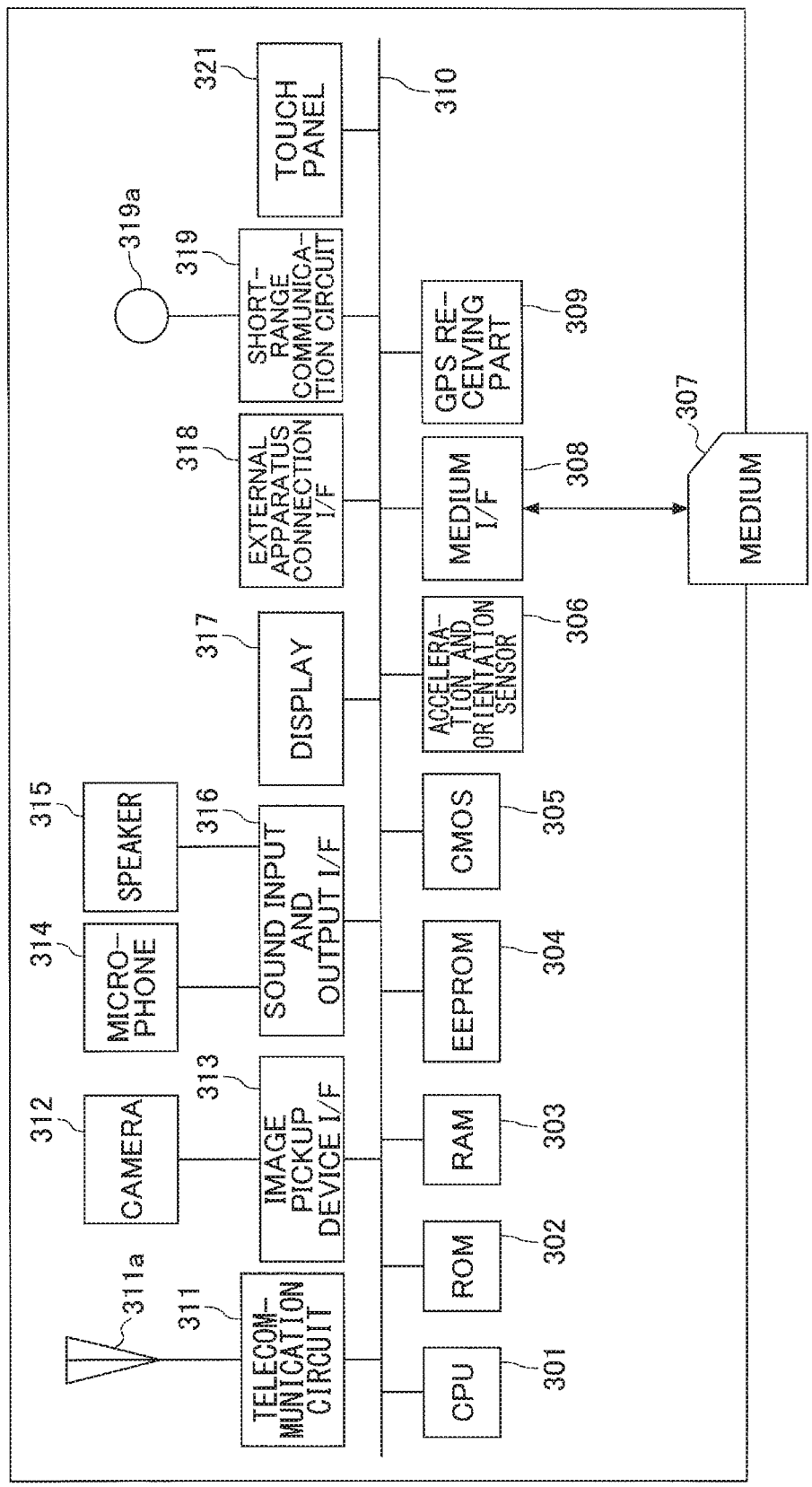
FIG. 5 is a hardware configuration diagram illustrating one example of communication terminals 3a, 3b, and 3c.

FIG. 5 is a hardware configuration diagram illustrating one example of a smartphone. As illustrated in FIG. 5, a communication terminal 3a as the smartphone includes a CPU 301, a ROM 302, a RAM 303, an EEPROM 304, a CMOS sensor 305, an acceleration and orientation sensor 306, a medium I/F 308, and a GPS receiving part 309.

The CPU 301 controls the entirety of the smartphone. The ROM 302 stores a program such as an IPL for driving the CPU 301. The RAM 303 is used as a work area for the CPU 301. The EEPROM 304 reads and writes various data such as the program for the smartphone under the control of the CPU 301. The CMOS sensor 305 captures an image of a subject (mainly, an image of the user himself or herself) to obtain image data under the control of the CPU 301. The acceleration and orientation sensor 306 includes various sensors such as an electromagnetic compass to detect geomagnetism, a gyrocompass, and an acceleration sensor. The medium I/F 308 controls reading data from and writing (storing) data to a recording medium 307 such as a flash memory. The GPS receiving part 309 receives GPS signals from GPSs.

Further, the smartphone includes a telecommunication circuit 311, a camera 312, an image pickup device I/F 313, a microphone 314, a speaker 315, a sound input and output I/F 316, a display 317, an external apparatus connection I/F 318, a short-range communication circuit 319, an antenna 319a for the short-range communication circuit 319, and a touch panel 321.

The telecommunication circuit 311 performs communication with another apparatus through the communication network 9. The camera 312 is a type of a built-in-type image pickup part for capturing an image of a subject to obtain image data under the control of the CPU 301. The image pickup device I/F 313 controls driving of the camera 312. The microphone 314 is a type of a built-in-type sound collecting part for inputting sound. The sound input and output I/F 316 performs processes to input a sound signal from the microphone 314 and to output a sound signal to the speaker 315 under the control of the CPU 301. The display 317 is a type of a liquid crystal or organic EL display part to display an image of a subject, various icons, and so forth. The external apparatus connection I/F 318 is an interface to connect to various external apparatuses. The short-range communication circuit 319 is a communication circuit that uses a NFC, Bluetooth (registered trademark), or the like. The touch panel 321 is a type of an input part for the user to touch the display 317 to operate the smartphone.

Further, the smartphone includes a bus line 310. The bus line 310 includes an address bus, a data bus, and so forth to electrically connect with various elements illustrated in FIG. 5 such as the CPU 301.

<Hardware Configuration of Each of PC, Car Navigation Apparatus, Service Providing Systems, and Authentication Systems>

With the use of FIG. 6, a hardware configuration of each of the PC, the car navigation apparatus, the service providing systems, and the authentication systems will now be described. Note that FIG. 6 is a hardware configuration diagram of each of examples of the PC, the car navigation apparatus, the service providing systems, and the authentication systems. Each of the PC, the car navigation apparatus, the service providing systems, and the authentication systems is a computer. Therefore, below, a configuration of a service providing system 5 will be described and descriptions of configurations of the other apparatuses and systems will be omitted.

A service providing system 5 includes a CPU 501 to control the entirety of the service providing system 5, a ROM 502 to store a program such as an IPL to drive the CPU 501, a RAM 503 used as a work area of the CPU 501, a HD 504 to store various data such as the program for the service providing system 5, a HDD (Hard Disk Drive) 505 to control reading various data from and writing various data to the HD 504 under the control of the CPU 501, a medium I/F 507 to control reading data from and writing (storing) data to a recording medium 506 such as a flash memory, a display 508 to display various information such as a cursor, a menu, a window, characters, and an image, a network I/F 509 to perform data communication through the communication network 9, a keyboard 511 having a plurality of keys for the user to input characters, numerical values, various instructions, and so forth, a mouse for the user to select and cause various instructions to be executed, to select an object to process, to move the cursor, and so forth, a CD-ROM drive 514 to control reading various data from and writing various data to a CD-ROM (Compact Disc Read-Only Memory) 513 as a type of a detachable recording medium, and a bus line 510 such as an address bus, a data bus, and so forth to electrically connect the above-mentioned various elements as illustrated in FIG. 5.

Note that recording media such as CD-ROMs to store the various programs according to the embodiments may be provided domestically or internationally in form of program products.

<<Functions of Embodiments>>

Figure 7:
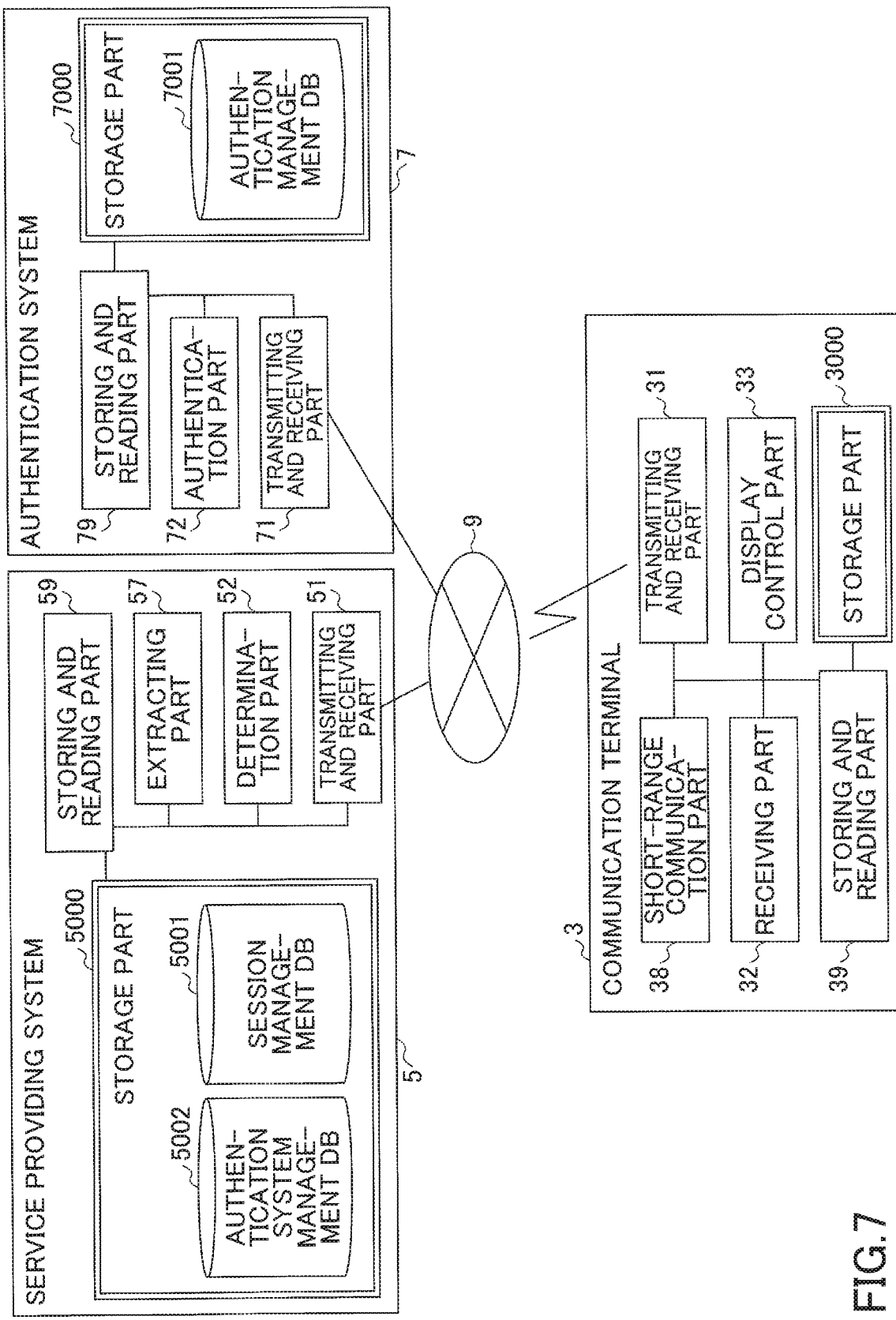
FIG. 7 is a functional block diagram of one example of the service delivery system.

Next, functions of the embodiments will be described. FIG. 7 is a functional block diagram illustrating one example of the service delivery system. Note that each of the functions that will now be described may be implemented by one or more processing circuits. A "processing circuit" includes one or more devices out of a processor programmed by software to execute the function such as a processor implemented by an electronic circuit; an ASIC (Application Specific Integrated Circuit), a DSP (digital signal processor), or a FPGA (field programmable gate array) designed to execute the function; a conventional circuit module; and so forth.

<Functions of Communication Terminals>

Hereinafter, with the use of the communication terminal 3a for which the hardware configuration is illustrated in FIG. 5, the functions of the communication terminals 3 will be described. In this regard, either one of the communication terminals 3b and 3c also has functions similar to or the same as the functions of the communication terminal 3a.

As illustrated in FIG. 7, the communication terminal 3 includes a transmitting and receiving part 31, a receiving part 32, a display control part 33, a short-range communication part 38, and a storing and reading part 39. Functions of these elements are implemented as a result of element(s) illustrated in FIG. 5 operating according to instructions from the CPU 301 according to the program for the communication terminal 3 written in the RAM 303 from the EEPROM 304.

Further, the communication terminal 3 includes a storage part 3000 implemented by the ROM 302, the RAM 303, and the EEPROM 304 illustrated in FIG. 5.

(Various Functions of Communication Terminals)

Next, with the use of FIG. 7, the various functions of the communication terminal 3 will be described in more detail.

The transmitting and receiving part 31 of the communication terminal 3 is implemented mainly by instructions from the CPU 301 illustrated in FIG. 5 and by the telecommunication circuit 311. Through the communication network 9, the transmitting and receiving part 31 transmits various data (or information) to and receives various data (or information) from a service providing system 5 and an authentication system 7.

The receiving part 32 is implemented mainly by instructions from the CPU 301 illustrated in FIG. 5 and by the touch panel 321, to receive an operation performed by the user.

The display control part 33 is implemented mainly by instructions from the CPU 301 illustrated in FIG. 5, to display a predetermined screen page on the display 317. Note that, in the case of the communication terminal 3a, the display control part 33 may use OpenGL ES (Open Graphics Library for Embedded Systems) to paste Mercator image data transmitted from the photographing apparatus 10 to cover a sphere to create a full spherical panoramic image.

The short-range communication part 38 is implemented mainly by instructions from the CPU 301 illustrated in FIG. 5 and by the short-range communication circuit 319, to perform communication with the photographing apparatus 10 and so forth by using the short-range communication circuit 319.

The storing and reading part 39 is implemented mainly by instructions from the CPU 301 illustrated in FIG. 5, to store various data (or information) in the storage part 3000 and to read various data (or information) from the storage part 3000.

<Functions of Service Providing Systems>

Next, with the use of FIGS. 6-10, functions of the service providing systems 5 will be described in detail. As illustrated in FIG. 7, a service providing system 5 includes a transmitting and receiving part 51, a determination part 52, an extracting part 57, and a storing and reading part 59. The respective functions of the elements are implemented as a result of any element(s) illustrated in FIG. 6 operating according to instructions from the CPU 501 according to the program for the service providing system 5 written from the HD 504 to the RAM 503.

Figure 6:
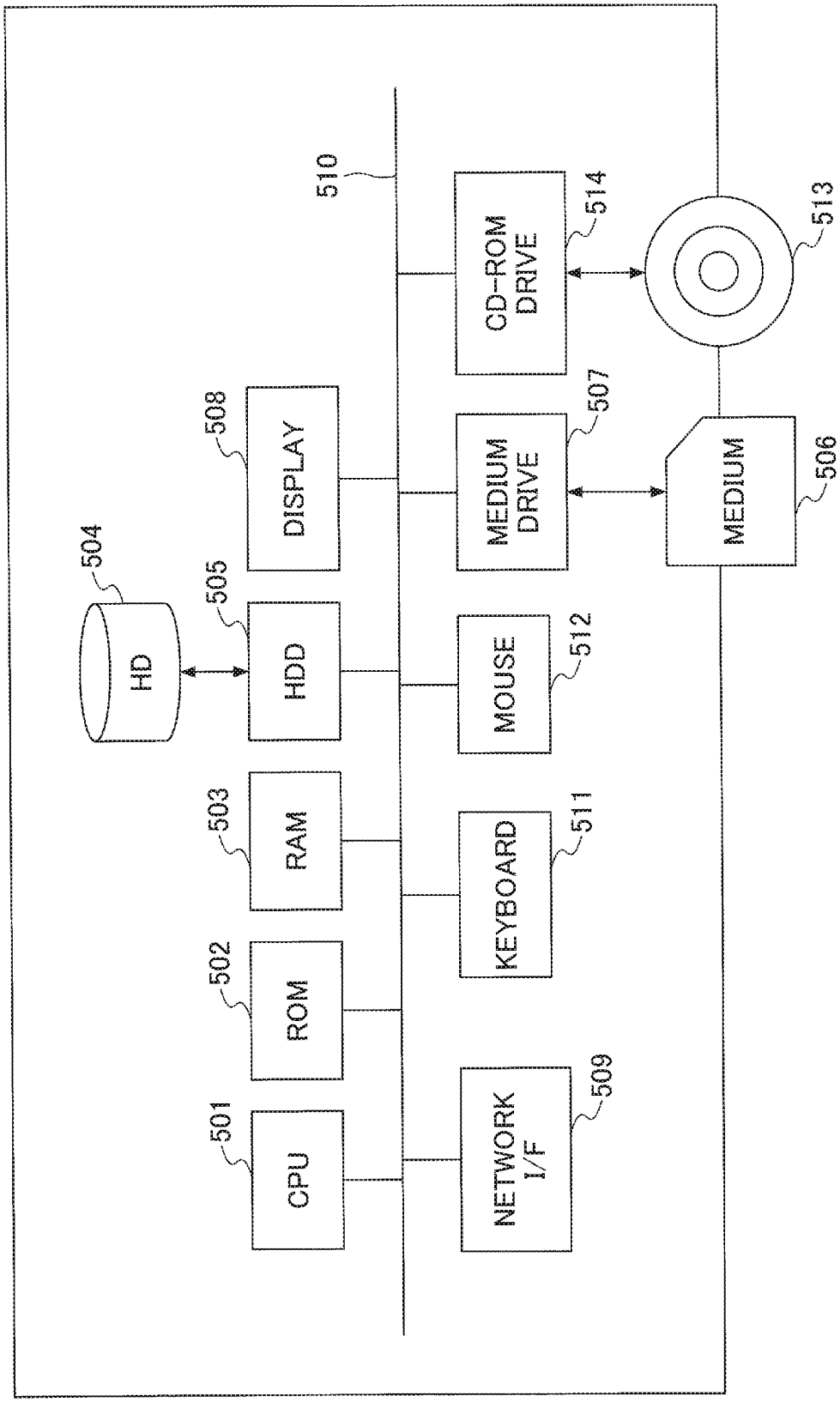
FIG. 6 is a hardware configuration diagram of one example of each of service providing systems 5a and 5b and authentication systems 7a, 7b, and 7c.

Further, a service providing system 5 includes a storage part 5000 implemented by the RAM 503 and the HD 504 illustrated in FIG. 6. The storage part 5000 stores various data sent from a communication terminal 3 and an authentication system 7.

Further, with the use of the storage part 5000, a session management DB 5001 and an authentication system management DB 5002 are implemented. The session management DB 5001 has a form of a session management table that will now be described. The authentication system management DB 5002 has a form of an authentication system management table that will now be described. Below, these tables will be described in detail.

(Session Management Table)

Figures 8, 9A:
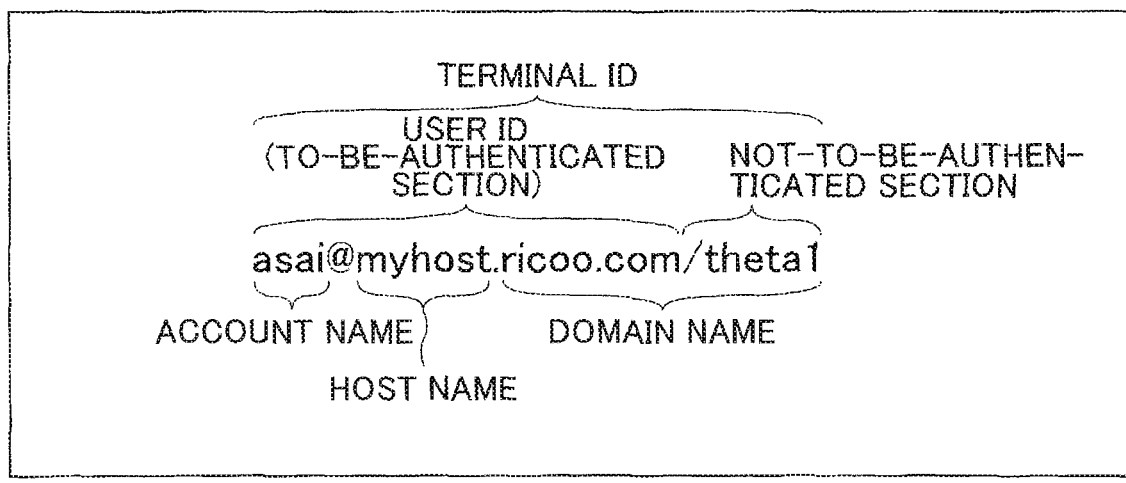
FIG. 8 is a conceptual diagram illustrating one example of a session management table.
FIG. 9A illustrates one example of a configuration pattern of a terminal ID (1/3).

FIG. 8 is a conceptual diagram illustrating one example of the session management table. The session management table associates session IDs to identify communication sessions established with communication terminals 3 to provide services to the communication terminals 3, the terminal IDs to identify the users of the communication terminals 3, and the IP addresses of the communication terminals 3 of the users identified by the terminal IDs with each other, and stores and manages these items of information.

Figure 9B:
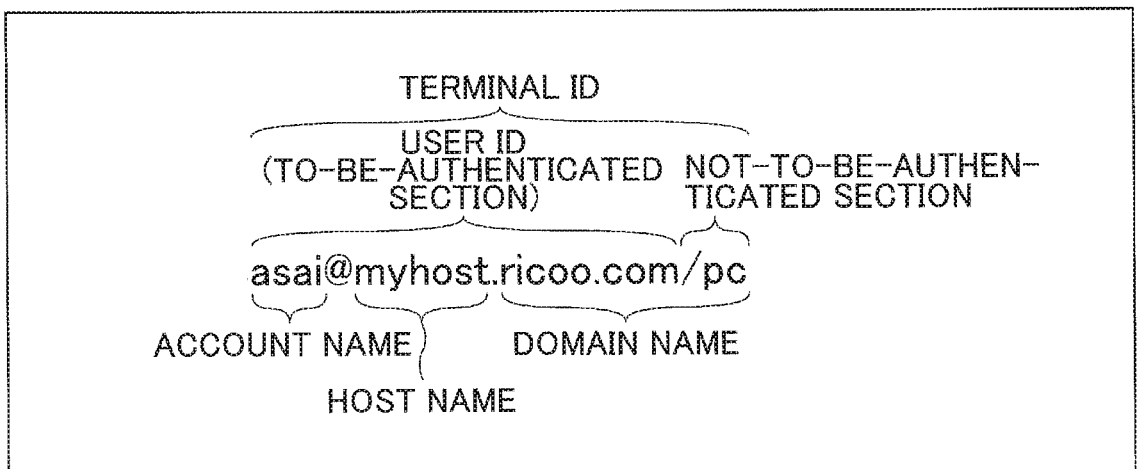
FIG. 9B illustrates one example of a configuration pattern of a terminal ID (2/3).
Figure 9C:
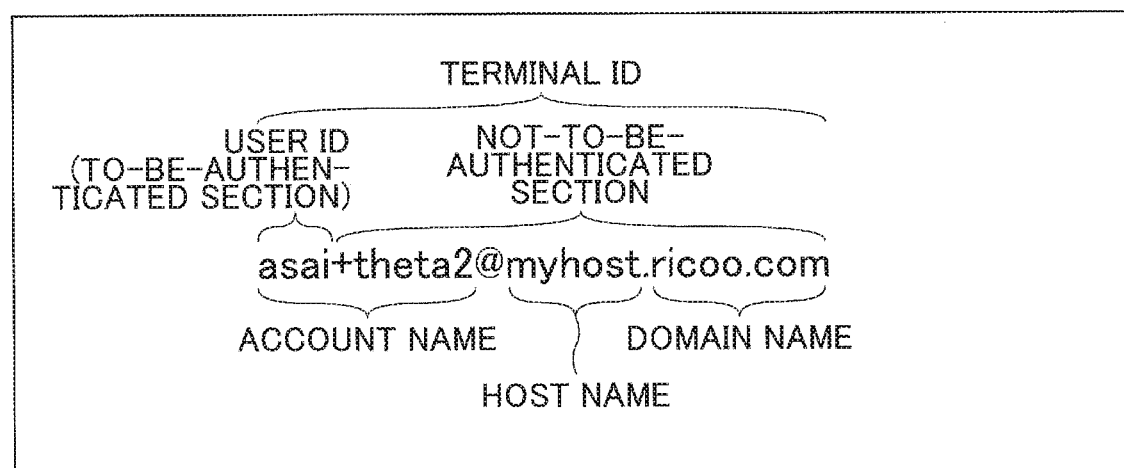
FIG. 9C illustrates one example of a configuration pattern of a terminal ID (3/3).

FIGS. 9A-9C illustrate email addresses as examples of the terminal IDs (identifications); each of the email addresses includes a to-be-authenticated section and a not-to-be-authenticated section. The to-be-authenticated section is a user ID to be used by an authentication system 7 to perform authentication. The not-to-be-authenticated section is not used by an authentication system 7 to perform authentication.

According to a first pattern illustrated in FIG. 9A, a to-be-authenticated section include an account name "asai", a host name "myhost", and a first segment "ricoo.com" of a domain name. A not-to-be-authenticated section includes a second segment "theta1" of the domain name. In this case, the extracting part 57 separates between the to-be-authenticated section and the not-to-be-authenticated section by using a symbol "/".

Further, also FIG. 9B illustrates the first pattern, however a not-to-be-authenticated section is different from FIG. 9A. In this regard, an authentication system 7 determines that the terminal ID illustrated in FIG. 9A and the terminal ID illustrated in FIG. 9B have the same IDs to perform authentication because these terminal IDs have the same to-be-authenticated sections.

Note that the terminal ID may be a terminal ID of a second pattern illustrated in FIG. 9C. According to the second pattern, the to-be-authenticated section includes a first segment "asai" of an account name. The not-to-be-authenticated section includes a second segment "theta2" of the account name, a host name "myhost", and a domain name "ricoo.com". In this case, the extracting part 57 separates between the to-be-authenticated section and the not-to-be-authenticated section by using a symbol (Authentication System Management Table)

FIG. 10 is a conceptual diagram illustrating one example of the authentication system management table. The authentication system management table associates, with the authentication system IDs for identifying respective authentication systems 7, the URLs (Uniform Resource Locators) to access the respective authentication systems 7, and stores and manages these items of information.

(Various Functions of Service Providing Systems)

Next, with the use of FIG. 7, the various functions of the service providing systems 5 will be described in detail.

The transmitting and receiving part 51 of a service providing system 5 is implemented mainly by instructions from the CPU 501 illustrated in FIG. 6 and by the network I/F 509, to transmit various data (or information) to and to receive various data (or information) from a communication terminal 3 and an authentication system 7 through the communication network 9.

The determination part 52 is implemented mainly by instructions from the CPU 501 illustrated in FIG. 6, to determine, for example, whether a communication session for providing a service to a communication terminal 3 has been already established.

The extracting part 5 is implemented mainly by instructions from the CPU 501 illustrated in FIG. 6, to extract from the terminal ID the user ID (the to-be-authenticated section) illustrated in FIGS. 9A-9C.

The storing and reading part 59 is implemented mainly by instructions from the CPU 501 illustrated in FIG. 6 and by the HDD 505, to store in the storage part 5000 various data, and to read from the storage part 5000 various data.

<Functions of Authentication Systems>

Next, with the use of FIGS. 7 and 11A-11C, functions of the authentication systems 7 will be described in detail. An authentication system 7 includes a transmitting and receiving part 71, an authentication part 72, and a storing and reading part 79. Functions of these elements are implemented as a result of any element(s) illustrated in FIG. 7 operating according to instructions from the CPU 501 according to the program for the authentication system 7 written from the HD 504 to the RAM 503.

Further, an authentication system 7 includes a storage part 7000 implemented by the RAM 503 and the HD 504 illustrated in FIG. 6. The storage part 7000 stores various data sent from a communication terminal 3 and a service providing system 5.

Further, the storage part 5000 includes an authentication management DB 7001. The authentication management DB 7001 has a form of an authentication management table that will be described now. Below, the table will be described in detail.

(Authentication Management Table)

FIG. 11A is a conceptual diagram illustrating one example of the authentication management table of the authentication system 7a. FIG. 11B is a conceptual diagram illustrating one example of the authentication management table of the authentication system 7b. FIG. 11C is a conceptual diagram illustrating one example of the authentication management table of the authentication system 7c.

Each of the authentication management tables associates the user IDs (the to-be-authenticated sections) out of the terminal IDs with passwords, and stores and manages these items of information.

(Various Functions of Authentication Systems)

Next, with the use of FIG. 7, the various functions of the authentication systems 7 will be described in detail.

The transmitting and receiving part 71 of an authentication system 7 is implemented mainly by instructions from the CPU 501 illustrated in FIG. 6 and by the network I/F 509, to transmit various data (or information) to and receive various data (or information) from a communication terminal 3 and a service providing system 5 through the communication network 9.

The authentication part 72 is implemented mainly by instructions from the CPU 501 illustrated in FIG. 6, to determine whether a communication terminal 3 that has transmitted an authentication request is an authorized communication terminal 3 that can receive a service, to authenticate the ID.

The storing and reading part 79 is implemented mainly by instructions from the CPU 501 illustrated in FIG. 6 and by the HDD 505, to store various data (or information) in the storage part 7000 and to read various data (or information) from the storage part 7000.

<<Process and Operation of Embodiments>>

Figure 12:
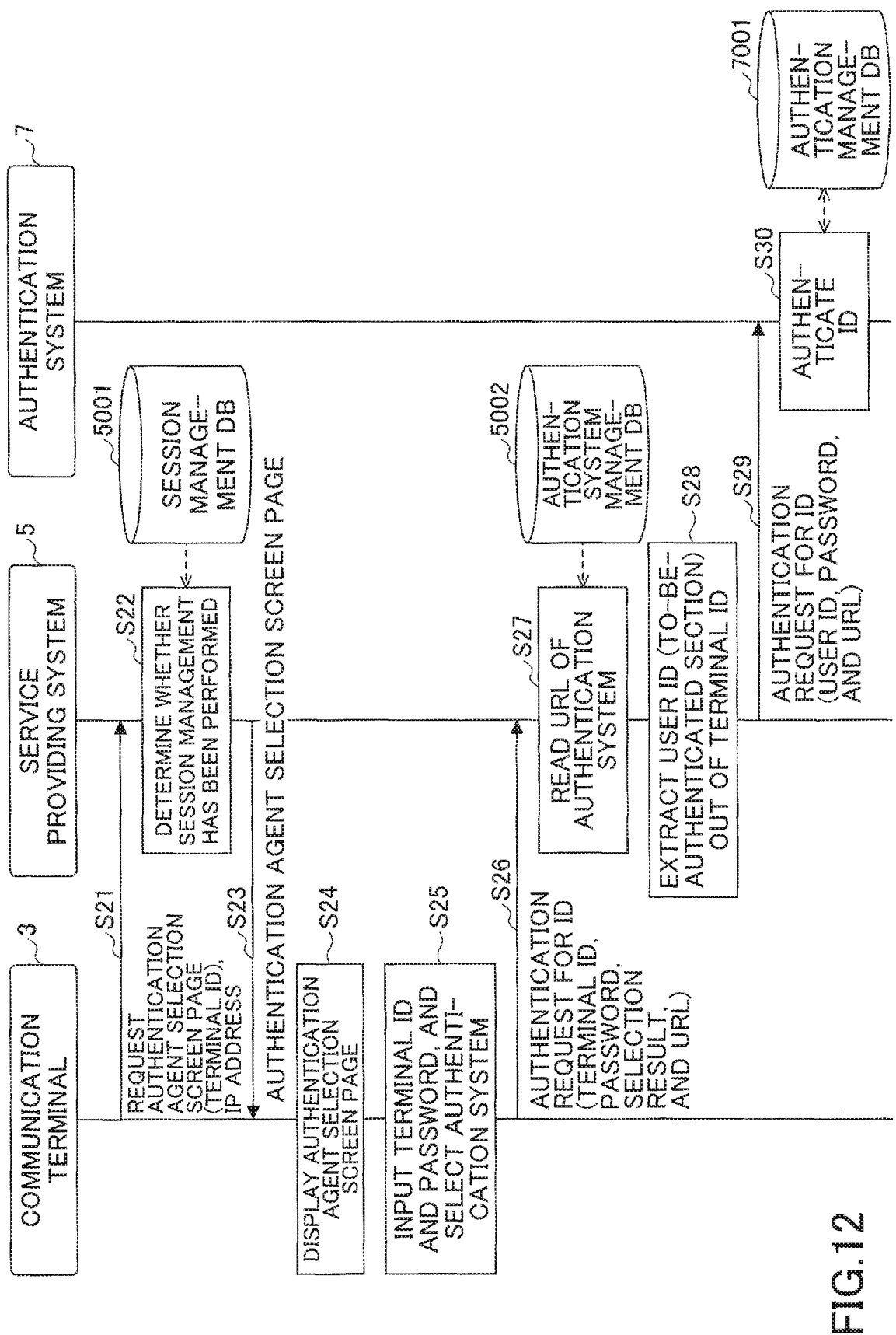
FIG. 12 is a sequence diagram illustrating one example of an authentication process.
Figure 13:
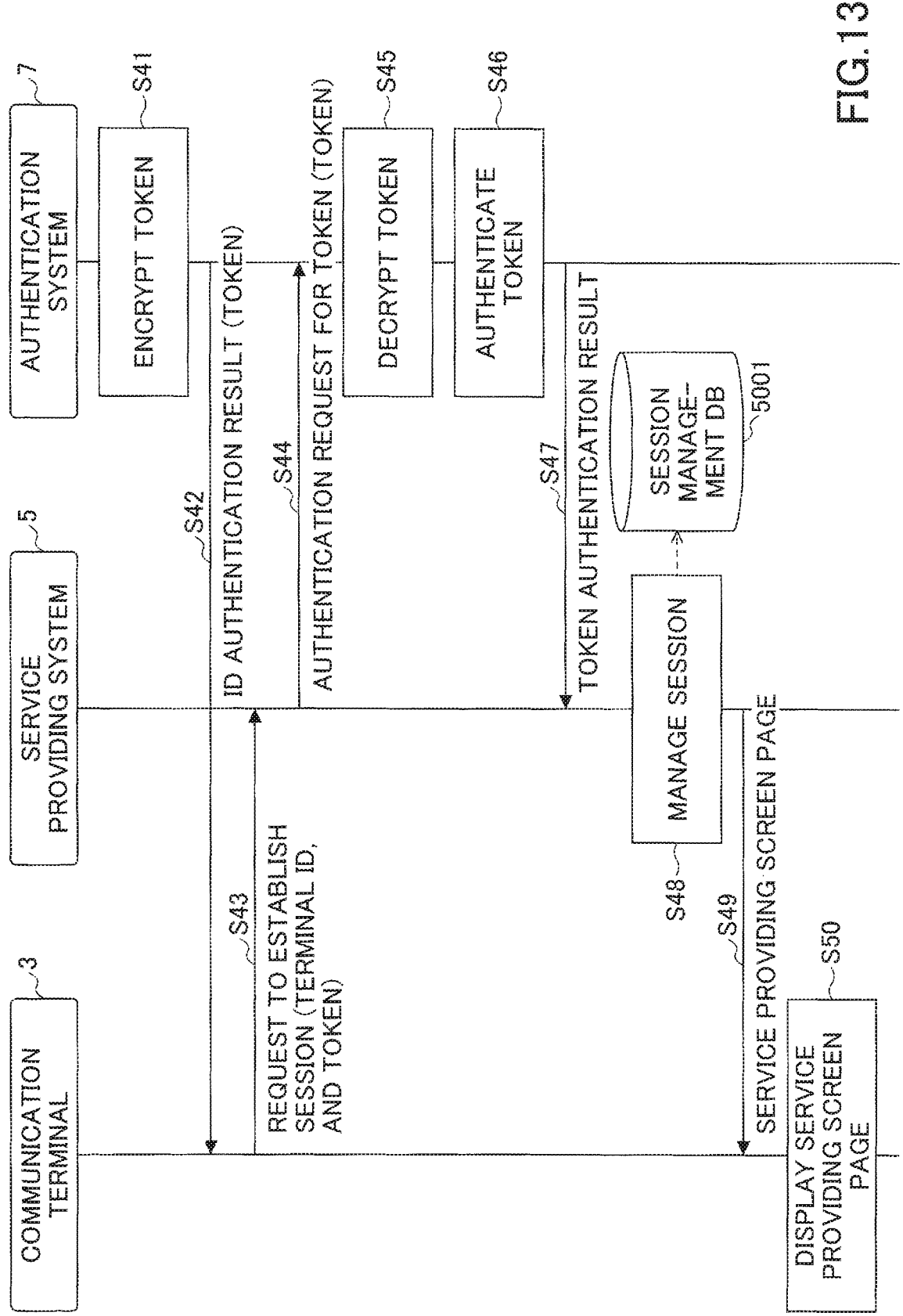
FIG. 13 is a sequence diagram illustrating one example of an authentication process.
Figure 14:
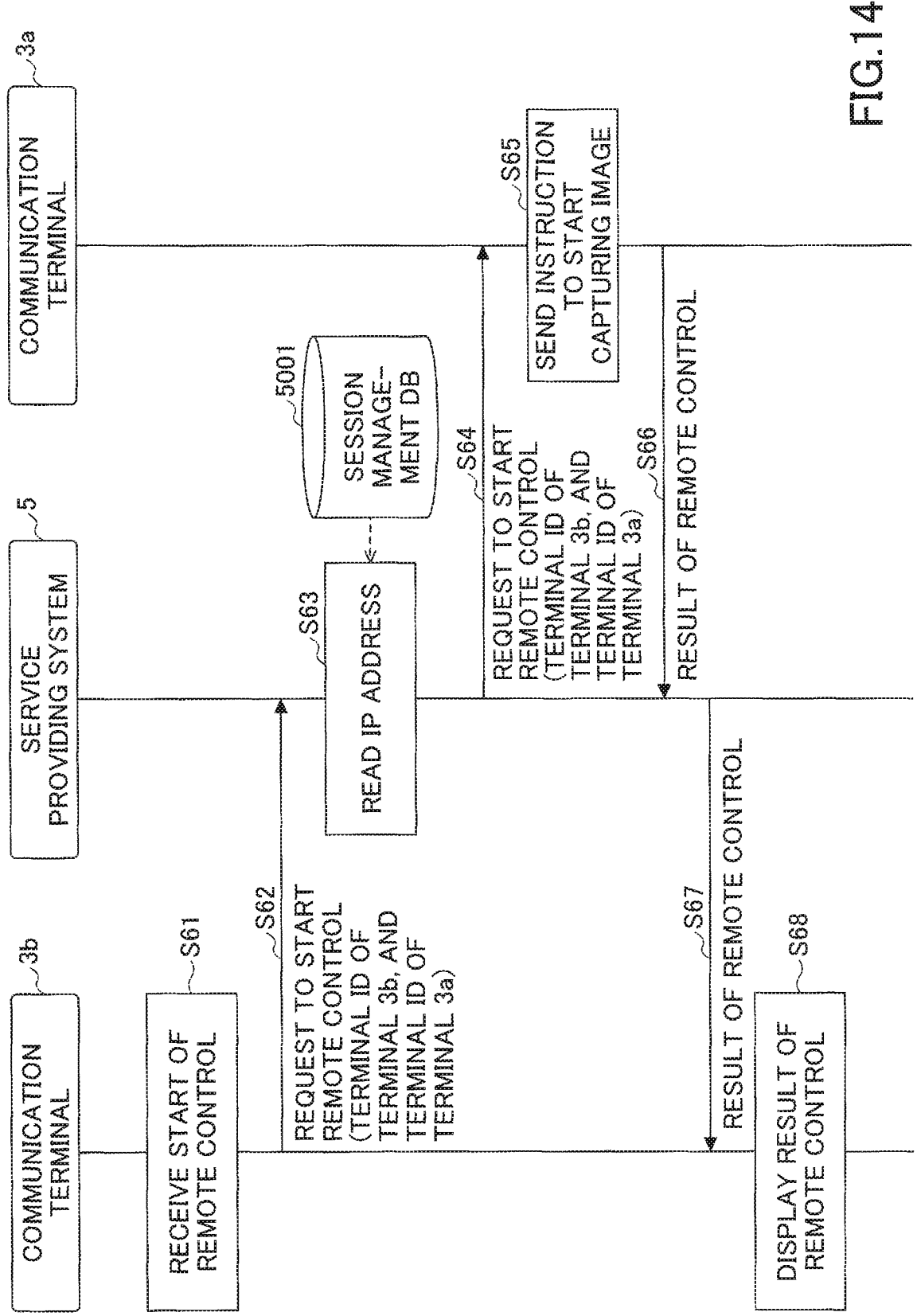
FIG. 14 is a sequence diagram illustrating one example of a remote control process.
Figure 15:
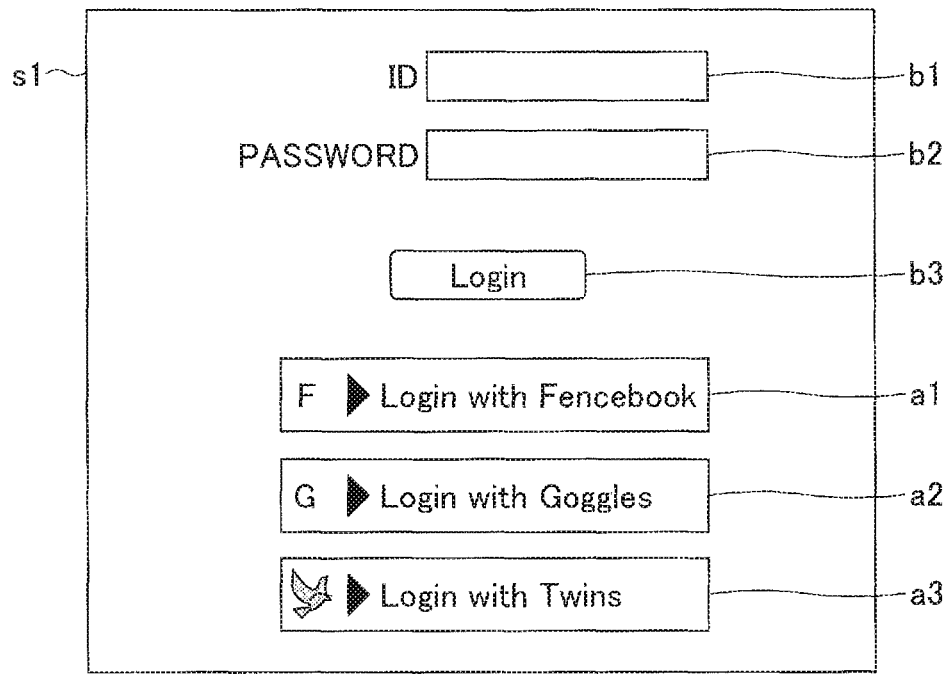
FIG. 15 illustrates a screen page example on the communication terminal 3b.
Figure 16:
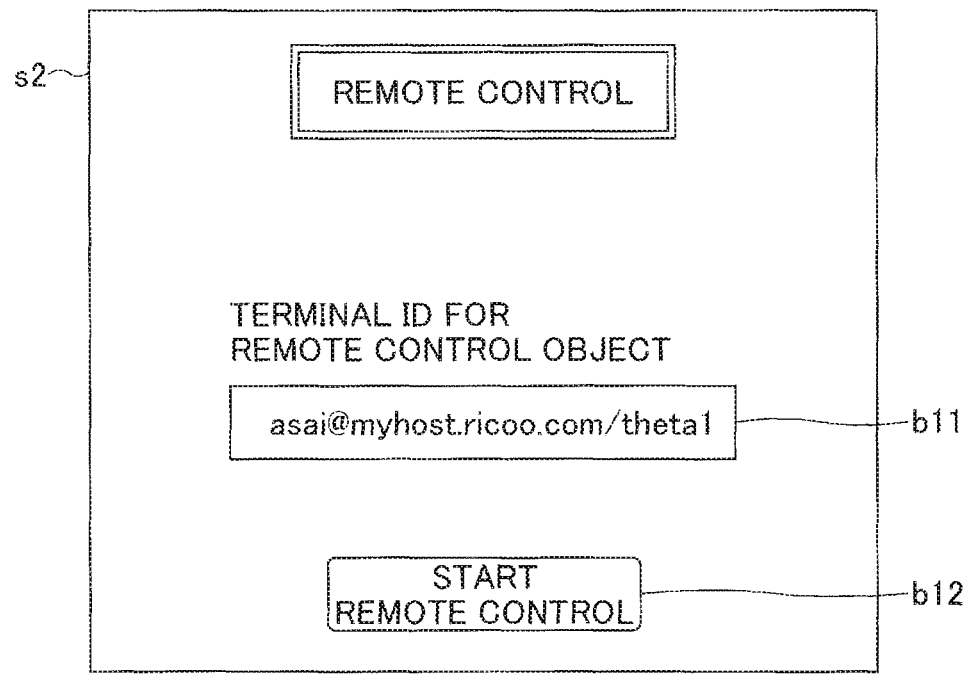
FIG. 16 illustrates a screen page example on the communication terminal 3b.
Figure 17:
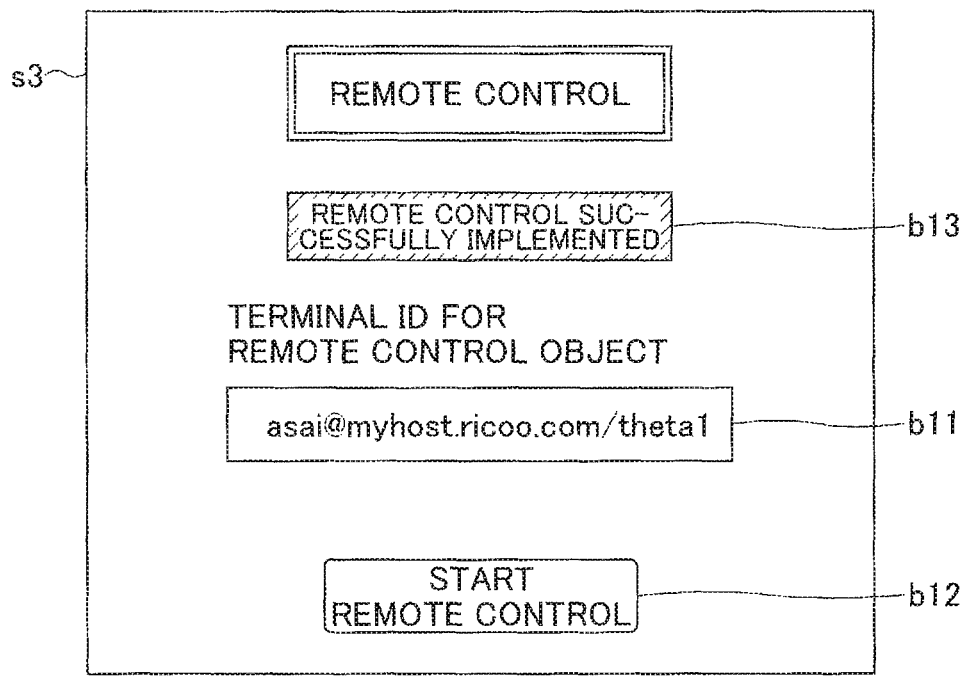
FIG. 17 illustrates a screen page example on the communication terminal 3b.

Next, with the use of FIGS. 12-17, a process and an operation of the embodiments will be described. FIGS. 12 and 13 are a sequence diagram illustrating one example of an authentication process. FIGS. 15-17 illustrate examples of screen pages on the communication terminal 3b.

As illustrated in FIG. 12, the transmitting and receiving part 31 of a communication terminal 3 transmits to a service providing system 5 a request to display an authentication agent selection screen page (step S21). The request includes the terminal ID of the communication terminal 3. Further, at this time, the transmitting and receiving part 31 transmits the own IP address. As a result, the transmitting and receiving part 51 of the service providing system 5 receives the request to display an authentication agent selection screen page and the IP address of the communication terminal 3.

Next, the determination part 52 of the service providing system 5 determines whether, in the session management table (see FIG. 8), the terminal ID received in step S21 is associated with a predetermined session ID and is managed (step S22). Hereinafter, a case where the terminal ID is not managed will be described.

The transmitting and receiving part 51 of the service providing system 5 transmits to the communication terminal 3 data of an authentication agent selection screen page (step S23). As a result, the transmitting and receiving part 31 of the communication terminal 3 receives the data of an authentication agent selection screen page.

Next, the display control part 33 of the communication terminal 3 displays the authentication agent selection screen page s1 illustrated in FIG. 15 or the like on the display 317 (step S24). FIG. 15 illustrates an example of the screen page to be displayed on the PC as the communication terminal 3b. The authentication agent selection screen page s1 includes a field b1 to input a terminal ID, a field b2 to input a password, a login button b3 for requesting for login (an authentication request). Further, the authentication agent selection screen page s1 includes authentication system selection buttons a1, a2, and a3 for respectively selecting the authentication systems 7a, 7b, and 7c. Assuming that the user inputs in the field b1 the own terminal ID, inputs in the field b2 the own password, presses a desired button out of the authentication system selection buttons a1, a2, and a3, and presses the login button b3, the receiving part 32 receives the respective inputs and selection (step S25). Then, the transmitting and receiving part 31 transmits to the service providing system 5 an authentication request for an ID (i.e., the terminal ID or the user ID) (step S26). The authentication request includes the terminal ID, the password, and the selection of the authentication system received in step S25, and the URL of the communication terminal 3. The selection of the authentication system indicates the authentication system ID to identify an authentication system 7. As a result, the transmitting and receiving part 51 of the service providing system 5 receives the authentication request for the ID.

Next, the storing and reading part 59 of the service providing system 5 searches the authentication system management table (see FIG. 10) with the authentication system ID that is indicated by the selection received in step S26 as a search key, to retrieve the URL of the corresponding authentication system (step S27).

Next, the extracting part 57 extracts the user ID (to-be-authenticated section) out of the terminal ID received in step S26 (step S28). The transmitting and receiving part 51 then transmits to the authentication system 7 identified by the URL retrieved in step S27 an authentication request for the ID (step S29). The authentication request for the ID includes the user ID (the to-be-authenticated section) extracted in step S28, the password received in step S26, and the URL of the communication terminal 3 received in step S26. Thus, the transmitting and receiving part 71 of the authentication system 7 receives the authentication request for the user.

Next, the storing and reading part 79 of the authentication system 7 searches the authentication management table (see FIGS. 11A-11C) with the use of the set of the user ID (the to-be-authenticated section) and the password received in step S29 as a search key to retrieve the same set of the to-be-authenticated section and the password. The authentication part 72 then uses the search result to perform the authentication (step S30). As a result, if the same set is managed, the authentication part 72 determines that the communication terminal 3 is an authorized communication terminal to receive a service from the service providing system 5. If the same set is not managed, the authentication part 72 determines that the communication terminal 3 is not an authorized communication terminal to receive a service from the service providing system 5.

Note that, in step S28, the extracting part 57 extracts from the terminal ID the to-be-authenticated section. However, an embodiment is not limited to this configuration. For example, it is also possible that the service providing system 5 does not include the extracting part 57, and, in step S29, the transmitting and receiving part 51 may transmit, in addition to the password and the URL, only the user ID (the to-be-authenticated section) out of the terminal ID.

Next, as illustrated in FIG. 13, the authentication part 72 of the authentication system 7 encrypts a token (a transmission right) (step S41). Then, the transmitting and receiving part 71 transmits, on the basis of the URL of the communication terminal 3 received in step S29, the authentication result to the communication terminal 3 (step S42). The authentication result indicates whether the communication terminal 3 is an authorized communication terminal and includes the token encrypted in step S41. Thus, the transmitting and receiving part 31 of the communication terminal 3 receives the user authentication result. Hereinafter, a case where the user is authorized will be described.

Note that, if the user is not authorized, i.e., if the authentication result in step S30 is negative, the authentication system 7 for example performs an error output, for example, through the service providing system 5 to the communication terminal 3 that transmitted the display request in step S21.

The transmitting and receiving part 31 of the communication terminal 3 transmits to the service providing system 5 a request to establish a session (step S43). This request includes the terminal ID, and the encrypted token received in step S42. As a result, the transmitting and receiving part 51 of the service providing system 5 receives the request to establish a session.

Next, in order for the service providing system 5 to determine that the communication terminal 3 that has transmitted the request to establish a session has been determined as an authorized communication terminal in step S30, the transmitting and receiving part 51 transmits to the authentication system 7 an authentication request for the token (step S44). This request includes the encrypted token received in step S43. As a result, the transmitting and receiving part 71 of the authentication system 7 receives the authentication request for the token.

Next, the authentication part 72 of the authentication system 7 decrypts the encrypted token received in step S44 (step S45). Then, the authentication part 72 compares the token before being encrypted in step S41 with the token decrypted in step S45, to authenticate the token (step S46). Then, the transmitting and receiving part 71 of the authentication system 7 transmits to the service providing system 5 the authentication result of step S46 (step S47). As a result, the transmitting and receiving part 51 of the service providing system 5 receives the authentication result. Hereinafter, a description will be made assuming that, in step S46, the token is authorized.

Note that, if, in step S46, the token is not authorized, the authentication system 7 for example performs an error output, for example, through the service providing system 5 to the communication terminal 3 that transmitted the request to establish a session in step S43.

Next, the storing and reading part 59 of the service providing system 5 assigns a new session ID in the session management table (see FIG. 8), and associates with the session ID the terminal ID received in step S26 and the IP address received in step S21, and manages these items of information (step S48). Then, the transmitting and receiving part 51 transmits to the communication terminal 3 data of a service providing screen page (step S49). As a result, the transmitting and receiving part 31 of the communication terminal 3 receives the data of a service providing screen page.

Next, the display control part 33 of the communication terminal 3 displays on the display 317 the service providing screen page s2 illustrated in FIG. 16 (step S50). FIG. 16 illustrates an example of the screen page displayed on the PC that is the communication terminal 3b. Hereinafter, as an example of a service that is provided, a remote control service for implementing remote control from the communication terminal 3b to the communication terminal 3a will be described. In the service providing screen page s2 illustrated in FIG. 16, an input field b11 for a terminal ID that identifies a user for an object of remote control and a "start remote control" button b12 are displayed.

Note that, if, in the above-described step S22, in the session management table, the terminal ID received in step S21 has been already associated with a certain session ID and has been already managed, the subsequent steps S23-S48 will be omitted, and the process directly proceeds to step S49.

Next, with the use of FIG. 14, the remote control process from the communication terminal 3b to the communication terminal 3a will be described. FIG. 14 is a sequence diagram illustrating one example of the remote control process. Note that, in this example, the communication terminals 3a and 3b illustrated in FIG. 1 are communication terminals used by the same user. Further, for the communication terminals 3a and 3b, the processes illustrated in FIGS. 12 and 13 have been finished. In this case, even for the user who can use, for example, different terminal IDs with the communication terminals 3a and 3b to receive respective services separately, the same authentication processes are performed on the basis of a common set of a to-be-authenticated section (in this example, "asai@myhost.ricoo.com") and a password (in this example, "aaaa") by an authentication system 7. Therefore, for a plurality of authentication processes, the user need not register terminal IDs and passwords for communication terminals 3, respectively. Further, in this example, the communication terminals 3a and 3b are managed in the session management table (see FIG. 8) with session IDs "se01" and "se02", respectively.

As illustrated in FIG. 14, in response to the user of the communication terminal 3b inputting in the input field b11 the terminal ID for using the communication terminal 3a that is a remote control object and pressing the "start remote control" button b12, the receiving part 32 of the communication terminal 3b receives the designation of the remote control object and the instruction to start remote control (step S61). In this example, as one example of remote control, from the communication terminal 3b to the communication terminal 3a, a request is sent to start a photographing operation by using the photographing apparatus 10. As a result, the transmitting and receiving part 31 of the communication terminal 3b transmits a request to start remote control to the service providing system 5 (step S62). This request includes the terminal ID for using the communication terminal 3b on a remote-controlling side and the terminal ID for using the communication terminal 3a on a remote-controlled side. As a result, the transmitting and receiving part 51 of the service providing system 5 receives the request to start remote control.

Next, the storing and reading part 59 of the service providing system 5 searches the session management table (see FIG. 8) with the use of the terminal ID of the communication terminal 3a on the remote-controlled side received in S62 as a search key, to retrieve the IP address of the communication terminal 3a on the remote-controlled side (step S63). Then, the transmitting and receiving part 51 transmits to the communication terminal 3a identified by the IP address retrieved in step S63 a request to start remote control (step S64). This request includes the terminal ID for using the communication terminal 3b on the remote-controlling side and the terminal ID for using the communication terminal 3a on the remote-controlled side. As a result, the transmitting and receiving part 31 of the communication terminal 3a receives the request to start remote control.

Next, the short-range communication part 38 of the communication terminal 3a transmits an instruction to start capturing an image of an object, a scene, or the like to the photographing apparatus 10 (step S65). The photographing apparatus 10 captures an image in response to the instruction to start capturing an image, and transmits the result of capturing an image to the communication terminal 3a where the short-range communication part 38 receives the result of capturing an image. Then, the transmitting and receiving part 31 of the communication terminal 3a transmits to the service providing system 5 a result of remote control (i.e., the result of capturing an image) (step S66). Thus, the transmitting and receiving part 51 of the service providing system 5 receives the result of remote control. Hereinafter, a case where the result of remote control indicates that the remote control has been successfully implemented will be described.

The transmitting and receiving part 51 of the service providing system 5 transmits the result of remote control to the communication terminal 3b that is the transmission source of the request in step S62 to start remote control (step S67). Thus, the transmitting and receiving part 31 of the communication terminal 3b receives the result of remote control.

Next, the display control part 33 of the communication terminal 3b displays an operation result display screen page s3 illustrated in FIG. 17. The operation result display screen page s3 illustrated in FIG. 17 additionally includes, in the service providing screen page s2, a message b13 indicating "remote control successfully implemented".

Note that, if the result of remote control transmitted in step S66 indicates a failure of remote control, the communication terminal 3a for example performs through the service providing system 5 an error output, for example, to the communication terminal 3a that transmitted the request to start remote control in step S62.

<<Main Advantageous Effects of Embodiments>>

According to the embodiments, as described above, a terminal ID includes a user ID (a to-be-authenticated section) and a not-to-be-authenticated section. As a result, once a user registers a set of a to-be-authenticated section and a password, the user need not perform a plurality of registrations even for using a plurality of communication terminals having different not-to-be-authenticated sections, respectively. Thus, troublesomeness to the user can be avoided.

Thus, the service providing systems, the service delivery systems, the service providing methods, and the non-transitory recording media have been described in the embodiments. However, the present invention is not limited to the embodiments, and various modifications and improvements can be made within the scope of the present invention.

[First Variant]

Figure 18:
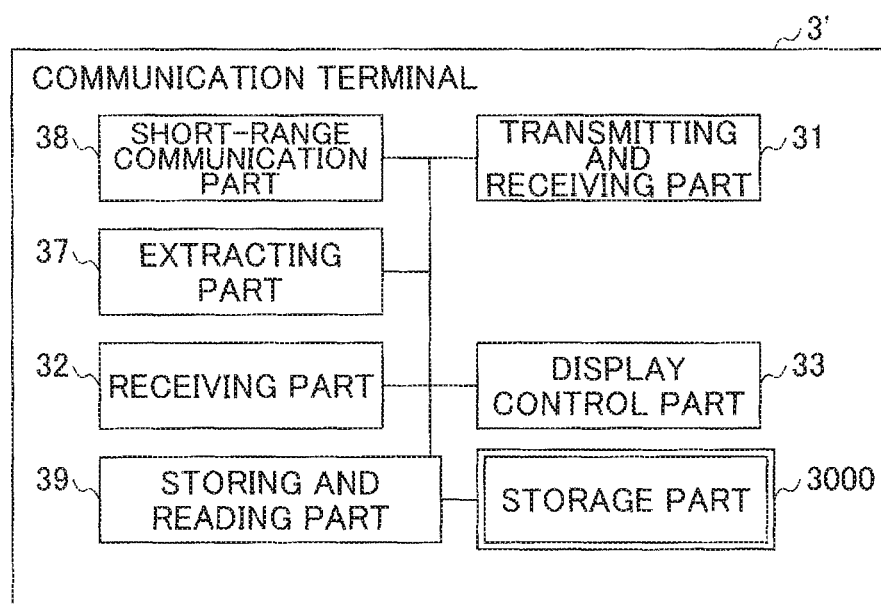
FIG. 18 is a functional block diagram illustrating one example of a communication terminal according to a first variant.
Figure 19:
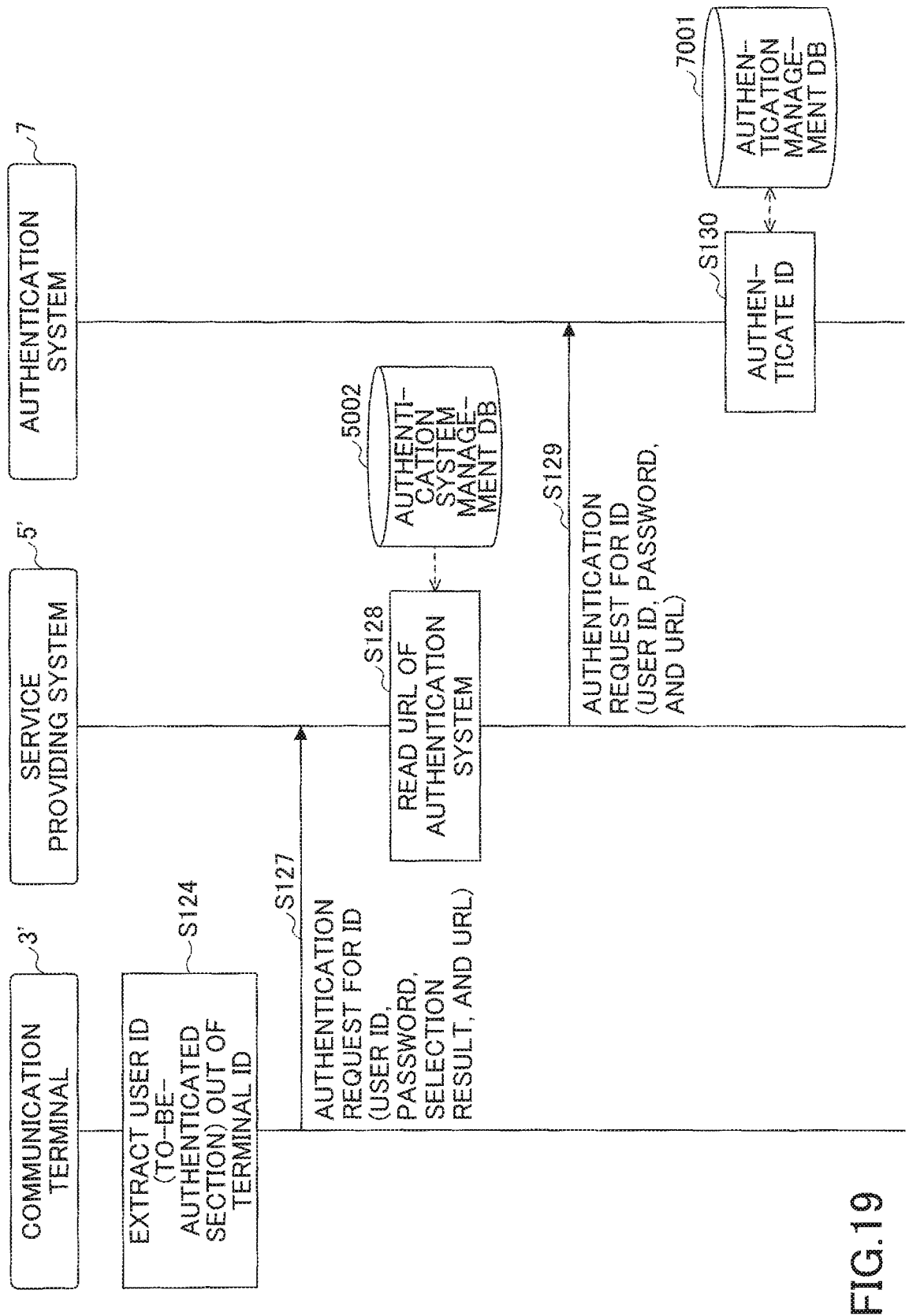
FIG. 19 a sequence diagram illustrating one example of a part of the authentication process according to the first variant.

With the use of FIGS. 18 and 19, a first variant of the embodiments will now be described. FIG. 18 is a functional block diagram of one example of a communication terminal according to the first variant. FIG. 19 is a sequence diagram illustrating one example of a part of the authentication process of the first variant.

In the above-described embodiments, a service providing system 5 extracts a to-be-authenticated section from a terminal ID in step S28. According to the first variant, a communication terminal 3' extracts a to-be-authenticated section from a terminal ID in step S124.

As illustrated in FIG. 18, according to the first variant, a communication terminal 3' includes an extracting part 37. The extracting part 37 has the same function as the function of the above-described extracting part 57. In this case, a service providing system 5' does not include the extracting part 57. Note that, in FIG. 18, the same reference signs are given to elements having functions the same as or similar to functions of the elements of FIG. 7, and the corresponding descriptions will be omitted.

Next, with the use of FIG. 19, a process and an operation of the first variant will be described. Note that, according to the first variant, the same process and operation as the process and operation of steps S21-S25 and steps S41-S50 of the above-described embodiments are performed. Therefore, steps S124-S130 for steps S26-S30 of FIG. 12 will now be described.

As illustrated in FIG. 19, the extracting part 37 of the communication terminal 3' extracts from the terminal ID the to-be-authenticated section (step S124). Then, the transmitting and receiving part 31 transmits to the service providing system 5' the authentication request for the user (step S127). The authentication request for the user includes the to-be-authenticated section extracted from the terminal ID in step S124, the password, and the selection of the authentication system received in step S25, and the URL of the communication terminal 3'. As a result, the transmitting and receiving part 51 of the service providing system 5' receives the authentication request for the user.

Next, in the same way as step S27, the storing and reading part 59 of the service providing system 5' searches the authentication system management table (see FIG. 10) with the use of the authentication system ID that is indicated by the selection received in step S127 as a search key, to retrieve the URL of the corresponding authentication system (step S128). Note that because steps S129 and S130 are the same as or similar to steps 29 and 30 of the above-described embodiments, the corresponding description will be omitted.

Thus, the first variant provides the same advantageous effects as the advantageous effects of the above-described embodiments.

Note that, in step S124, the extracting part 37 extracts from the terminal ID the to-be-authenticated section. However, an embodiment is not limited to this configuration. For example, it is also possible that the communication terminal 3' does not include the extracting part 37, and in step S127, the transmitting and receiving part 31 may transmit only the to-be-authenticated section out of the terminal ID in addition to the password, the selection, and the URL.

[Second Variant]

Figure 20:
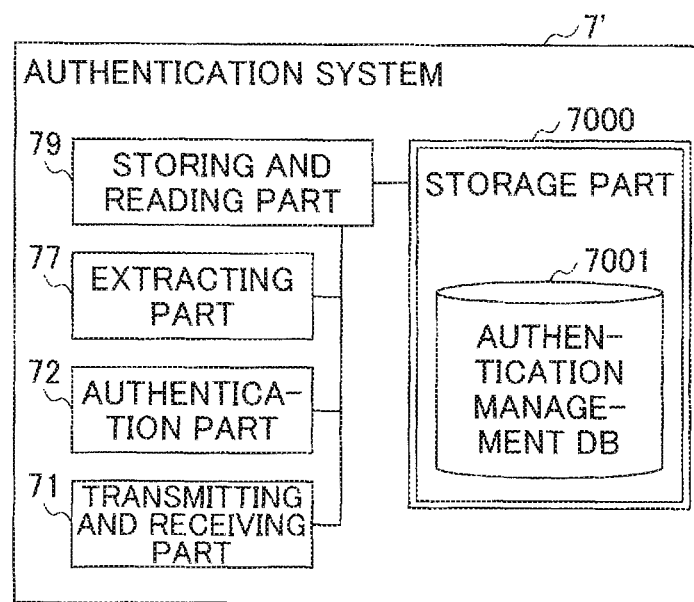
FIG. 20 is a functional block diagram illustrating one example of an authentication system according to a second variant.
Figure 21:
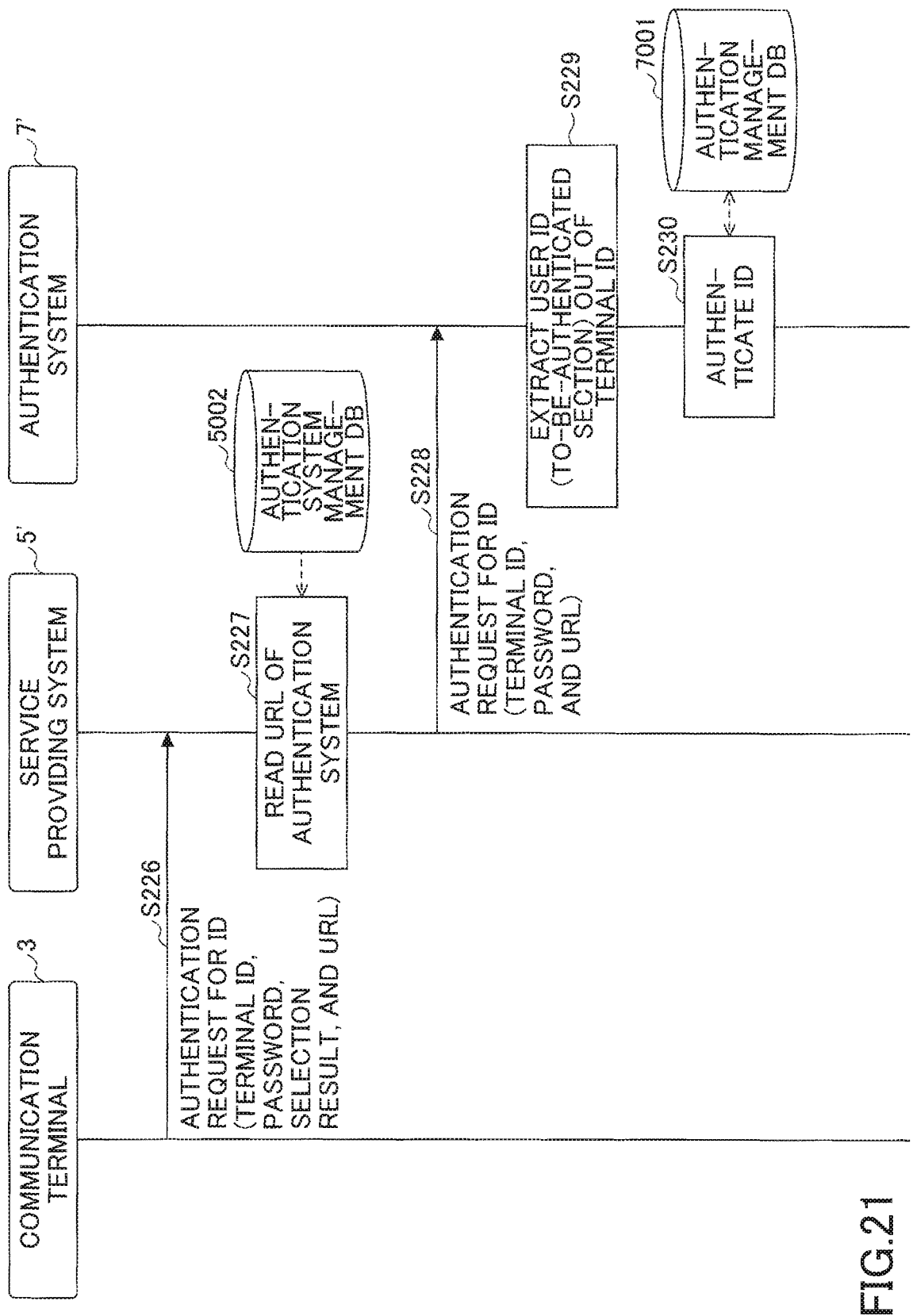
FIG. 21 is a sequence diagram illustrating one example of a part of the authentication process according to the second variant.

With the use of FIGS. 20 and 21, a second variant of the embodiments will now be described. FIG. 20 is a functional block diagram of one example of an authentication system according to the second variant. FIG. 21 is a sequence diagram illustrating one example of a part of the authentication process of the second variant.

According to the above-described embodiments, the service providing system 5 extracts in step S28 a to-be-authenticated section from a terminal ID. According to the second variant, an authentication system 7' extracts in step S229 a to-be-authenticated section from a terminal ID.

As illustrated in FIG. 20, according to the second variant, an authentication system 7' includes an extracting part 77. The extracting part 77 has a function the same as or similar to the function of the extracting part 57. In this case, a service providing system 5' does not include the extracting part 57. Note that, in FIG. 20, the same reference signs are given to elements having functions the same as or similar to functions of elements of FIG. 7, and the corresponding descriptions will be omitted.

Next, with the use of FIG. 21, a process and an operation of the second variant will be described. Note that, according to the second variant, the same process and operation as the process and operation of steps S21-S25 and steps S41-S50 of the above-described embodiments are performed. Therefore, steps S226-S230 for steps S26-S30 of FIG. 12 will now be described.

As illustrated in FIG. 21, in the same way as step S26, the transmitting and receiving part 31 transmits to the service providing system 5' the authentication request for the user (step S226). The authentication request for the user includes the terminal ID, the password, and the selection of the authentication system received in step S25, and the URL of the communication terminal 3. The selection of the authentication system indicates the authentication system ID for identifying the authentication system 7. As a result, the transmitting and receiving part 51 of the service providing system 5' receives the authentication request for the user.

Next, the storing and reading part 59 of the service providing system 5' searches the authentication system management table (see FIG. 10) with the use of the authentication system ID that is the selection received in step S226 as a search key, to retrieve the URL of the corresponding authentication system (step S227).

Next, the transmitting and receiving part 51 transmits to the authentication system 7 identified by the URL retrieved in step S227 an authentication request for the user (step S228). The authentication request for the user includes the terminal ID, the password, and the URL of the communication terminal 3 received in step S226. As a result, the transmitting and receiving part 71 of the authentication system 7' receives the authentication request for the user.

Next, the extracting part 77 of the authentication system 7' extracts the to-be-authenticated section from the terminal ID received in step S228 (step S229). Then, in the same way as step S30, the storing and reading part 79 of the authentication system 7' searches the authentication management table (see FIGS. 11A-11C) with the use of the set of the to-be-authenticated section and the password received in step S228 as a search key to retrieve the same set of the to-be-authenticated section and the password. The authentication part 72 uses the search result to perform the authentication (step S230).

Thus, the second variant provides the same advantageous effects as the advantageous effects of the above-described embodiments.

[Third Variant]

According to the above-described embodiments, in step S25, the user inputs the terminal ID and the password. However, an embodiment is not limited to this configuration. For example, in such a case where a communication terminal is an electric component and has no screen page displayed for the user to input information, the terminal ID and the password previously stored in the communication terminal are transmitted in step S26 to the service providing system. As a specific method to thus previously store in a communication terminal a terminal ID and a password, a method of transmitting the terminal ID and the password from another PC to the communication terminal through a communication network; a method of inserting a recording medium (such as a SIM card) where the terminal ID and the password are stored into the communication terminal and the terminal ID and the password are sent to the communication terminal; and so forth can be cited.

DESCRIPTION OF REFERENCE SIGNS 1 service delivery system
3a communication terminal
3b communication terminal
3c communication terminal
5a service providing system
5b service providing system
7a authentication system
7b authentication system
7c authentication system
9 communication network
10 photographing apparatus
51 transmitting and receiving part (one example of a receiving part and one example of a transmitting part)
52 determination part (one example of a determination part)
57 extracting part
59 storing and reading part
5000 storage part
5001 session management DB (one example of a session management part)
5002 authentication system management DB

RELATED ART DOCUMENT

Patent Document

Patent Document 1: Japanese Unexamined Patent Application Publication No. 2015-201827

What is claimed is:

1. A service providing system including a plurality of authentication systems, the service providing system comprising:
a memory; and
a processor configured to authenticate a user of a plurality of communication terminals by,
receiving, from a first communication terminal of the plurality of communication terminals, terminal identification information, the terminal identification information uniquely identifying which of the plurality of communication terminals transmitted the terminal identification information, the terminal identification information including a to-be-authenticated section for authentication of the user and a not-to-be-authenticated section not for the authentication of the user,
transmitting, to the first communication terminal, data of an authentication agent selection screen page for selecting an authentication system from among the plurality of authentication systems,
receiving, from the first communication terminal, a selection result indicating a selected authentication system from among the plurality of authentication systems,
transmitting, to the selected authentication system, only the to-be-authenticated section out of the terminal identification information based on the selection result such that, while the terminal identification information uniquely identifies the first communication terminal as a source of the terminal identification information, the to-be-authenticated section included therein is common amongst the plurality of communication terminals,
receiving from the selected authentication system an authentication result of the authentication, and
in a case where the authentication result is affirmative, associating the terminal identification information with session identification information to identify a communication session to be established with the first communication terminal for providing a service to the first communication terminal, and
managing the session identification information and the terminal identification information.

2. The service providing system according to claim 1, wherein
the processor is further configured to,
receive from the first communication terminal the terminal identification information and a request to display the authentication agent selection screen page, and
transmit the data of the authentication agent selection screen page to the first communication terminal, in response to the terminal identification information not being managed by the processor.

3. The service providing system according to claim 1, wherein the terminal identification information is an email address or a URL.

4. The service providing system according to claim 1, wherein the to-be-authenticated section and the not-to-be-authenticated section of the terminal identification information are separated by a predetermined sign.

5. A service delivery system comprising:
the service providing system according to claim 1; and
the plurality of communication terminals, the plurality of communication terminals each configured to transmit respective terminal identification information to the service providing system.

6. The service delivery system according to claim 5, wherein the plurality of communication terminals are each a mobile terminal, an information processing terminal, a business machine, a home appliance, an electric component, a medical device, or an industrial device.

7. A method of operating a service providing system including a plurality of authentication systems, the method comprising:
authenticating a user of a plurality of communication terminals by,
receiving, from a first communication terminal of the plurality of communication terminals, terminal identification information, the terminal identification information uniquely identifying which of the plurality of communication terminals transmitted the terminal identification information, the terminal identification information including a to-be-authenticated section for authentication of the user and a not-to-be-authenticated section not for the authentication of the user;
transmitting, to the first communication terminal, data of an authentication agent selection screen page for selecting an authentication system from among the plurality of authentication systems;
receiving, from the first communication terminal, a selection result indicating a selected authentication system from among the plurality of authentication systems;
transmitting, to the selected authentication system, only the to-be-authenticated section out of the terminal identification information based on the selection result such that, while the terminal identification information uniquely identifies the first communication terminal as a source of the terminal identification information, the to-be-authenticated section included therein is common amongst the plurality of communication terminals;
receiving from the selected authentication system an authentication result of the authentication; and
in a case where the authentication result is affirmative, associating the terminal identification information with session identification information to identify a communication session to be established with the first communication terminal for providing a service to the first communication terminal, and managing the session identification information and the terminal identification information.

8. A non-transitory recording medium storing a program that when executed by a processor, causes the processor to, authenticate a user of a plurality of communication terminals by,
receiving, from a first communication terminal of the plurality of communication terminals, terminal identification information, the terminal identification information uniquely identifying which of the plurality of communication terminals transmitted the terminal identification information, the terminal identification information including a to-be-authenticated section for authentication of the user and a not-to-be-authenticated section not for the authentication of the user,
transmitting, to the first communication terminal, data of an authentication agent selection screen page for selecting an authentication system from among a plurality of authentication systems,
receiving, from the first communication terminal, a selection result indicating a selected authentication system from among the plurality of authentication systems,
transmitting, to the selected authentication system, only the to-be-authenticated section out of the terminal identification information based on the selection result such that, while the terminal identification information uniquely identifies the first communication terminal as a source of the terminal identification information, the to-be-authenticated section included therein is common amongst the plurality of communication terminals,
receiving from the authentication system an authentication result of the authentication, and
in a case where the authentication result is affirmative, associating the terminal identification information with session identification information to identify a communication session to be established with the first communication terminal for providing a service to the first communication terminal, and managing the session identification information and the terminal identification information.

9. The method according to claim 7, further comprising:
receiving from the first communication terminal, the terminal identification information and a request to display the authentication agent selection screen page; and
transmitting the data of the authentication agent selection screen page to the first communication terminal, in response to the terminal identification information not being managed by the service providing system.

* * * * *